United States Patent
Hall

(10) Patent No.: US 11,724,554 B2
(45) Date of Patent: Aug. 15, 2023

(54) WEIGHT DISTRIBUTION HITCH SYSTEM WITH SWAY REDUCTION

(71) Applicant: Hall Logic, Inc., Provo, UT (US)

(72) Inventor: David R. Hall, Provo, UT (US)

(73) Assignee: Hall Labs LLC, Provo, UT (US)

( * ) Notice: Subject to any disclaimer, the term of this patent is extended or adjusted under 35 U.S.C. 154(b) by 144 days.

(21) Appl. No.: 17/184,560

(22) Filed: Feb. 24, 2021

(65) Prior Publication Data
US 2021/0260941 A1   Aug. 26, 2021

Related U.S. Application Data

(60) Provisional application No. 62/981,003, filed on Feb. 24, 2020, provisional application No. 62/980,969, filed on Feb. 24, 2020, provisional application No. 62/981,002, filed on Feb. 24, 2020, provisional application No. 62/980,966, filed on Feb. 24, 2020,
(Continued)

(51) Int. Cl.
| | |
|---|---|
| *B60D 1/24* | (2006.01) |
| *B60D 1/58* | (2006.01) |
| *B60D 1/06* | (2006.01) |
| *B60D 1/34* | (2006.01) |
| *B60D 1/46* | (2006.01) |
| *B62D 63/08* | (2006.01) |

(52) U.S. Cl.
CPC .............. *B60D 1/247* (2013.01); *B60D 1/065* (2013.01); *B60D 1/248* (2013.01); *B60D 1/345* (2013.01); *B60D 1/465* (2013.01); *B60D 1/583* (2013.01); *B62D 63/08* (2013.01)

(58) Field of Classification Search
CPC ........ B60D 1/247; B60D 1/065; B60D 1/248; B60D 1/30; B60D 1/327; B60D 1/34; B60D 1/345; B60D 1/465; B60D 1/583; B60D 1/167; B60D 1/1675; B60D 1/46; B60D 1/06; B62D 63/08
See application file for complete search history.

(56) References Cited

U.S. PATENT DOCUMENTS 2,597,657 A  *  5/1952  Mathisen ............... B60D 1/345
                                                    267/2
2,679,404 A  *  5/1954  Thompson ............... B60D 1/34
                                                    280/484
(Continued)

*Primary Examiner* — Minnah L Seoh
*Assistant Examiner* — Maurice L Williams

(57) ABSTRACT

A weight distribution system used with a hitch on a vehicle and a trailer, the weight distribution system comprising a moment bar with a forward end attached to the hitch so as to pivot about a generally vertical axis, the moment bar extending rearwardly along a center longitudinal plane of the trailer toward a rearward portion, the moment bar configured to exert a forward moment on the vehicle in response to an upward force on the rearward portion; a bracket attached to a trailer frame element, wherein the bracket is above the first rearward portion and further from the center longitudinal plane of the trailer than the rearward portion; and a tension member combined with a tension mechanism so as to increase and decrease a tensile force between the bracket and the rearward portion, to thereby increase and decrease the upward force on the rearward portion whereby sway of the trailer is reduced by biasing the system back to the centerline when the vehicle and trailer are out of alignment is disclosed.

15 Claims, 17 Drawing Sheets

Related U.S. Application Data provisional application No. 62/980,976, filed on Feb. 24, 2020, provisional application No. 62/980,978, filed on Feb. 24, 2020, provisional application No. 62/980,990, filed on Feb. 24, 2020, provisional application No. 62/980,994, filed on Feb. 24, 2020, provisional application No. 62/980,962, filed on Feb. 24, 2020, provisional application No. 62/980,999, filed on Feb. 24, 2020.

(56) References Cited

U.S. PATENT DOCUMENTS

| | | | | |
|---|---|---|---|---|
| 2,715,034 | A * | 8/1955 | Cornwall | B60D 1/345 280/483 |
| 2,793,879 | A * | 5/1957 | Bair | B62D 53/068 280/406.2 |
| 2,808,272 | A * | 10/1957 | Reese | B60D 1/30 172/450 |
| 3,194,584 | A * | 7/1965 | Reese | B60D 1/345 280/406.1 |
| 3,306,628 | A * | 2/1967 | Haxton | B60D 1/345 280/455.1 |
| 3,347,562 | A * | 10/1967 | Bolyard | B60D 1/345 280/489 |
| 3,370,867 | A * | 2/1968 | Berlincourt | B60D 1/345 280/406.2 |
| 3,441,291 | A * | 4/1969 | Morris, Jr. | B60D 1/345 280/490.1 |
| 3,482,856 | A * | 12/1969 | Reese | B60D 1/345 280/406.2 |
| 3,490,788 | A * | 1/1970 | Mann | B60D 1/345 280/406.1 |
| 3,497,240 | A * | 2/1970 | Doerfer | B60D 1/50 280/489 |
| 3,520,556 | A * | 7/1970 | Warner | B60D 1/345 280/455.1 |
| 3,542,394 | A * | 11/1970 | Palage | B60D 1/065 280/455.1 |
| 3,542,395 | A * | 11/1970 | Millikan | B60D 1/065 280/455.1 |
| 3,552,771 | A * | 1/1971 | Hendricks | B60D 1/065 280/455.1 |
| 3,567,251 | A * | 3/1971 | Dalton | B60D 1/345 280/406.2 |
| 3,572,750 | A * | 3/1971 | Derr, Jr. | B60D 1/247 280/455.1 |
| 3,600,004 | A * | 8/1971 | Newkirk | B60D 1/345 280/455.1 |
| 3,633,939 | A * | 1/1972 | Evernham | B60D 1/345 280/455.1 |
| 3,679,231 | A * | 7/1972 | Derr, Jr. | B60D 1/345 280/491.5 |
| 3,700,261 | A * | 10/1972 | Suckow | B60D 1/345 280/455.1 |
| 3,751,069 | A * | 8/1973 | Suckow | B60D 1/345 280/406.2 |
| 3,756,618 | A * | 9/1973 | Lewis | B60D 1/345 280/455.1 |
| 3,778,088 | A * | 12/1973 | Alexander | B60D 1/345 280/406.2 |
| 3,814,463 | A * | 6/1974 | Tunesi | B60D 1/32 280/455.1 |
| 3,900,212 | A * | 8/1975 | Ewing | B60D 1/345 280/492 |
| 4,003,586 | A * | 1/1977 | Luck | B60D 1/345 280/455.1 |
| 4,049,288 | A * | 9/1977 | Young | B60D 1/247 411/530 |
| 4,053,174 | A * | 10/1977 | Guettler, Jr. | B60D 1/345 280/455.1 |
| 4,154,454 | A * | 5/1979 | Lewin | B60D 1/34 280/455.1 |
| 4,213,627 | A * | 7/1980 | Thompson | B60D 1/065 280/455.1 |
| 4,230,333 | A * | 10/1980 | Persyn | B60D 1/345 280/406.2 |
| 4,275,897 | A * | 6/1981 | Moyer | B60D 1/345 280/455.1 |
| 4,722,542 | A * | 2/1988 | Hensley | B60D 1/345 280/456.1 |
| 4,792,151 | A * | 12/1988 | Feld | B60D 1/065 280/509 |
| 5,184,839 | A * | 2/1993 | Guedry | B60D 1/345 280/475 |
| 5,465,991 | A * | 11/1995 | Kass | B60D 1/345 280/490.1 |
| 5,868,414 | A * | 2/1999 | McCoy | B60D 1/30 280/455.1 |
| 5,890,726 | A * | 4/1999 | McCoy | B60D 1/247 280/406.1 |
| 5,951,036 | A * | 9/1999 | Sargent | B60D 1/66 280/477 |
| 5,984,341 | A * | 11/1999 | Kass | B60D 1/46 280/406.1 |
| 6,045,147 | A * | 4/2000 | Schmidt | B60D 1/465 280/406.1 |
| 6,299,191 | B1 * | 10/2001 | Sargent | B60D 1/247 280/455.1 |
| 6,419,257 | B1 * | 7/2002 | McCoy | B60D 1/32 280/455.1 |
| 6,860,501 | B2 * | 3/2005 | Schmidt | B60D 1/065 280/455.1 |
| 7,364,180 | B2 * | 4/2008 | Hensley | B60D 1/00 280/491.5 |
| 7,857,344 | B2 * | 12/2010 | Hensley | B60D 1/30 280/455.1 |
| 8,070,176 | B1 * | 12/2011 | Su | B62D 25/209 280/406.1 |
| 8,186,702 | B2 * | 5/2012 | McCoy | B60D 1/58 280/406.1 |
| 8,550,486 | B2 * | 10/2013 | Scott | B60D 1/58 280/455.1 |
| 8,590,915 | B2 * | 11/2013 | Connell | B60D 1/143 280/406.1 |
| 9,522,582 | B2 * | 12/2016 | Cullen | G01G 23/18 |
| 9,579,940 | B2 * | 2/2017 | Mauerman | B60D 1/247 |
| 9,744,820 | B1 * | 8/2017 | Robins | B60D 1/06 |
| 10,183,536 | B2 * | 1/2019 | McCoy | B60D 1/06 |
| 10,406,877 | B2 * | 9/2019 | Ghannam | B60D 1/06 |
| 10,543,725 | B2 * | 1/2020 | Hall | B62D 63/08 |
| 10,875,368 | B1 * | 12/2020 | Angel | B60D 1/325 |
| 10,960,719 | B2 * | 3/2021 | Anderson | G01L 5/0033 |
| 11,046,131 | B2 * | 6/2021 | McCall | B60D 1/58 |
| 11,331,970 | B2 * | 5/2022 | Hall | B60D 1/247 |
| 2018/0281667 | A1 * | 10/2018 | Robinson | B60Q 1/50 |
| 2019/0100126 | A1 * | 4/2019 | Nelson | B32B 15/082 |
| 2020/0156424 | A1 * | 5/2020 | Anderson | B60D 1/36 |
| 2021/0094370 | A1 * | 4/2021 | McAllister | B60D 1/248 |

* cited by examiner

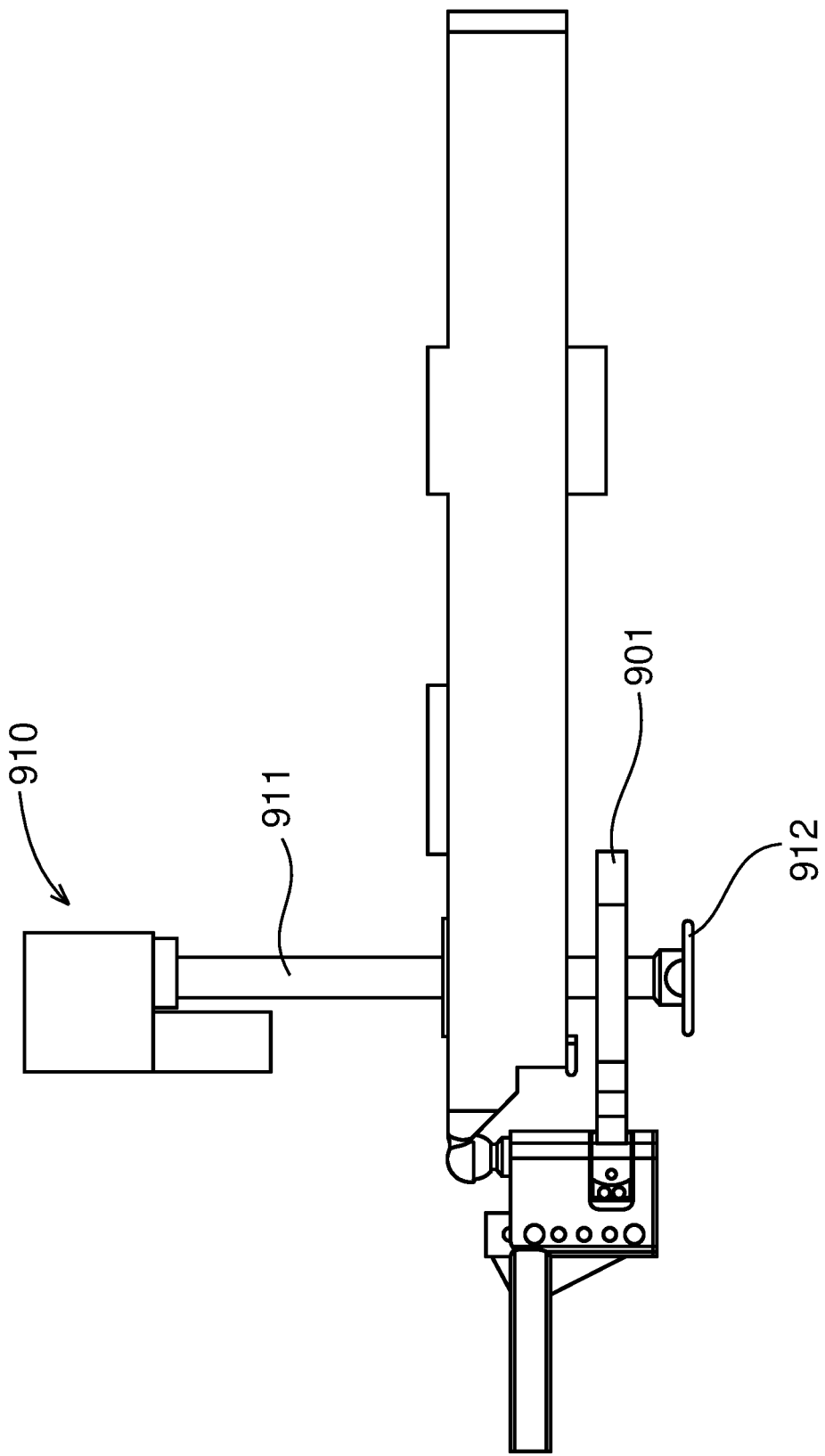

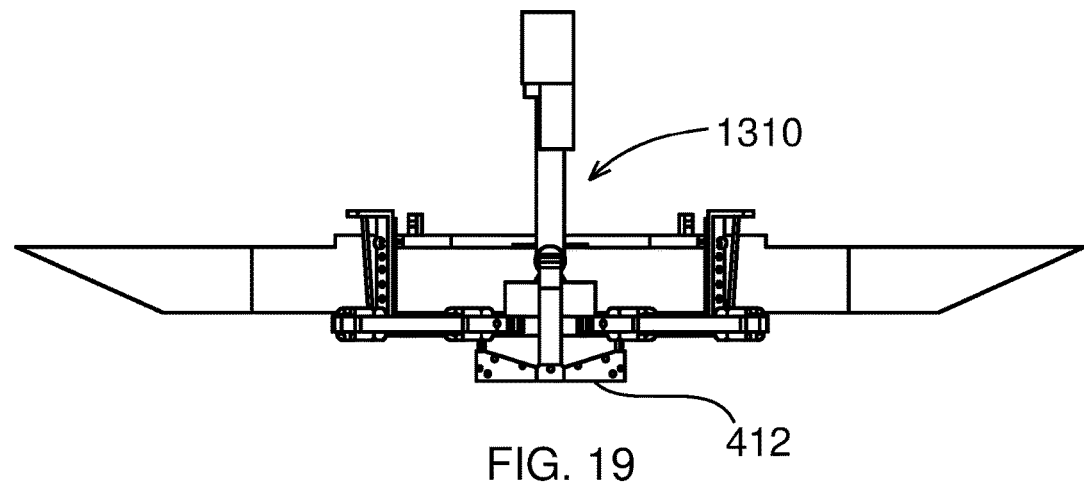
FIG. 19
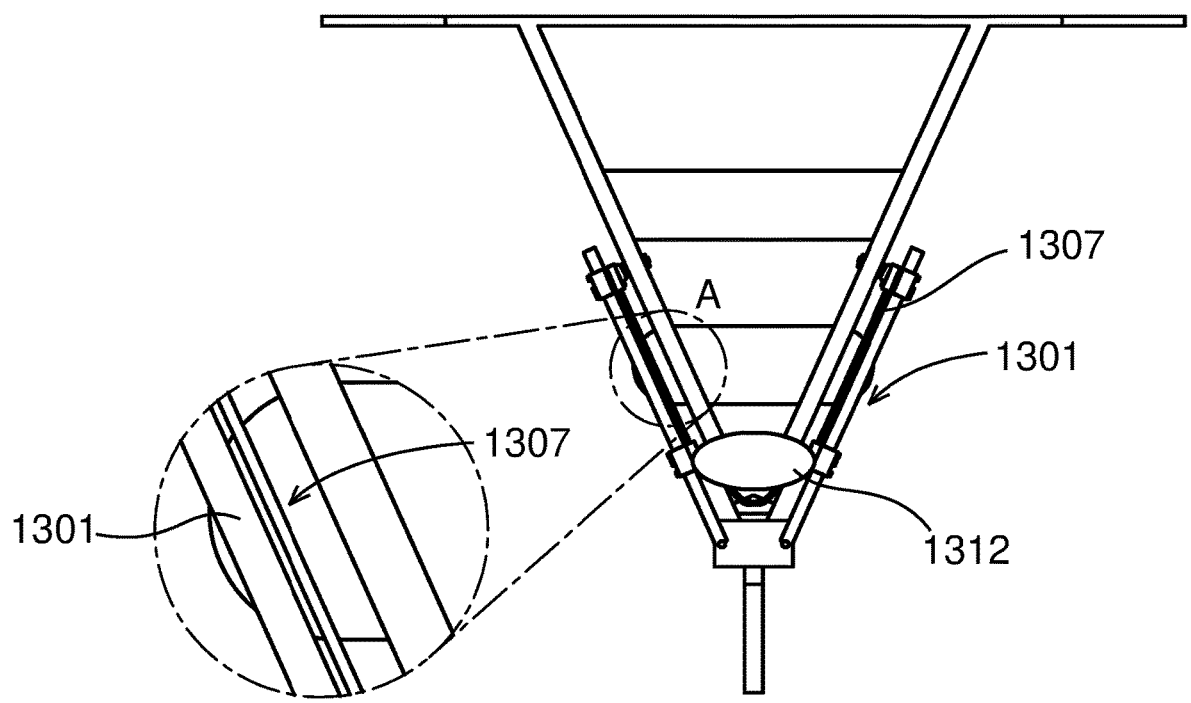
FIG. 20A
FIG. 20

WEIGHT DISTRIBUTION HITCH SYSTEM WITH SWAY REDUCTION

CROSS-REFERENCE TO RELATED APPLICATIONS

This application claims priority to U.S. Provisional Patent Application Nos. 62/980,962 titled "Weight Distribution Hitch System" filed on 24 Feb. 2020; 62/980,966 titled "Weight Distribution Hitch System" filed on 24 Feb. 2020; 62/980,969 titled "Weight Distribution Hitch System" filed on 24 Feb. 2020; 62/980,976 titled "Weight Distribution Hitch System" filed on 24 Feb. 2020; 62/980,978 titled "Weight Distribution Hitch System" filed on 24 Feb. 2020; 62/980,990 titled "Weight Distribution Hitch System" filed on 24 Feb. 2020; 62/980,994 titled "Weight Distribution Hitch System" filed on 24 Feb. 2020; 62/980,999 titled "Weight Distribution Hitch System" filed on 24 Feb. 2020; 62/981,002 titled "Weight Distribution Hitch System" filed on 24 Feb. 2020; and 62/981,003 titled "Weight Distribution Hitch System" filed on 24 Feb. 2020, each of which is incorporated herein by reference in its entirety.

TECHNICAL FIELD

The present disclosure relates to trailer hitches. More particularly, it relates to trailer hitches equipped with weight distribution systems.

BACKGROUND

A typical trailer hitch connects to a vehicle near its rear bumper. When the trailer is connected, the downward load from the trailer tongue on the hitch can cause the vehicle to squat, putting extra load on the rear axle and lessening the load on the front axle. This can reduce the traction of the front tires and can cause the headlights to point upward. Equalizer hitches can prevent these problems by using spring bars to exert a moment on the vehicle, which shifts the resulting load of the trailer tongue toward the center of the vehicle, eliminating the squat. However, equalizer hitches require tedious setup and are not easily adjusted. Changes to the tow vehicle, the trailer, or the load carried by the trailer may require readjustment. These adjustments take time and may require special tools. Because of this, users may either fail to adjust or adjust incorrectly. Accordingly, a hitch that is easier to set up and adjust is desirable.

SUMMARY

In a first aspect, the disclosure provides a weight distribution system used with a hitch on a vehicle and a trailer, the weight distribution system comprising a moment bar with a forward end attached to the hitch so as to pivot about a generally vertical axis, the moment bar extending rearwardly along a center longitudinal plane of the trailer toward a rearward portion, the moment bar configured to exert a forward moment on the vehicle in response to an upward force on the rearward portion; a bracket attached to a trailer frame element, wherein the bracket is above the first rearward portion and further from the center longitudinal plane of the trailer than the rearward portion; and a tension member combined with a tension mechanism so as to increase and decrease a tensile force between the bracket and the rearward portion, to thereby increase and decrease the upward force on the rearward portion whereby sway of the trailer is reduced by biasing the system back to the centerline when the vehicle and trailer are out of alignment.

In a second aspect, the disclosure provides a weight distribution hitch system comprising a lifting mechanism; a moment bar pivotally connected about a vertical axis to a hitch coupling; and a linkage bar with a rear portion connected to the trailer and a front portion adapted to interact with the lifting mechanism; wherein a rear portion of the moment bar is pivotally connected about a lateral axis to the linkage bar such that when the lifting mechanism lifts on the front portion of the linkage bar, the rear portion of the moment bar is raised and induces a forward moment on the hitch coupling.

Further aspects and embodiments are provided in the foregoing drawings, detailed description, and claims.

BRIEF DESCRIPTION OF THE DRAWINGS

The following drawings are provided to illustrate certain embodiments described herein. The drawings are merely illustrative and are not intended to limit the scope of claimed inventions and are not intended to show every potential feature or embodiment of the claimed inventions. The drawings are not necessarily drawn to scale; in some instances, certain elements of the drawing may be enlarged with respect to other elements of the drawing for purposes of illustration.

FIG. 11 is a side view of a ninth exemplary embodiment of a weight distribution hitch system according to the present disclosure.

FIG. 19 is a front view of a thirteenth exemplary embodiment of a weight distribution hitch system according to the present disclosure.

FIG. 20 is s bottom view of the embodiment of FIG. 19.

FIG. 20A is close-up view of the moment arm and cable in the embodiment of FIG. 20.

DETAILED DESCRIPTION

Figure 1:
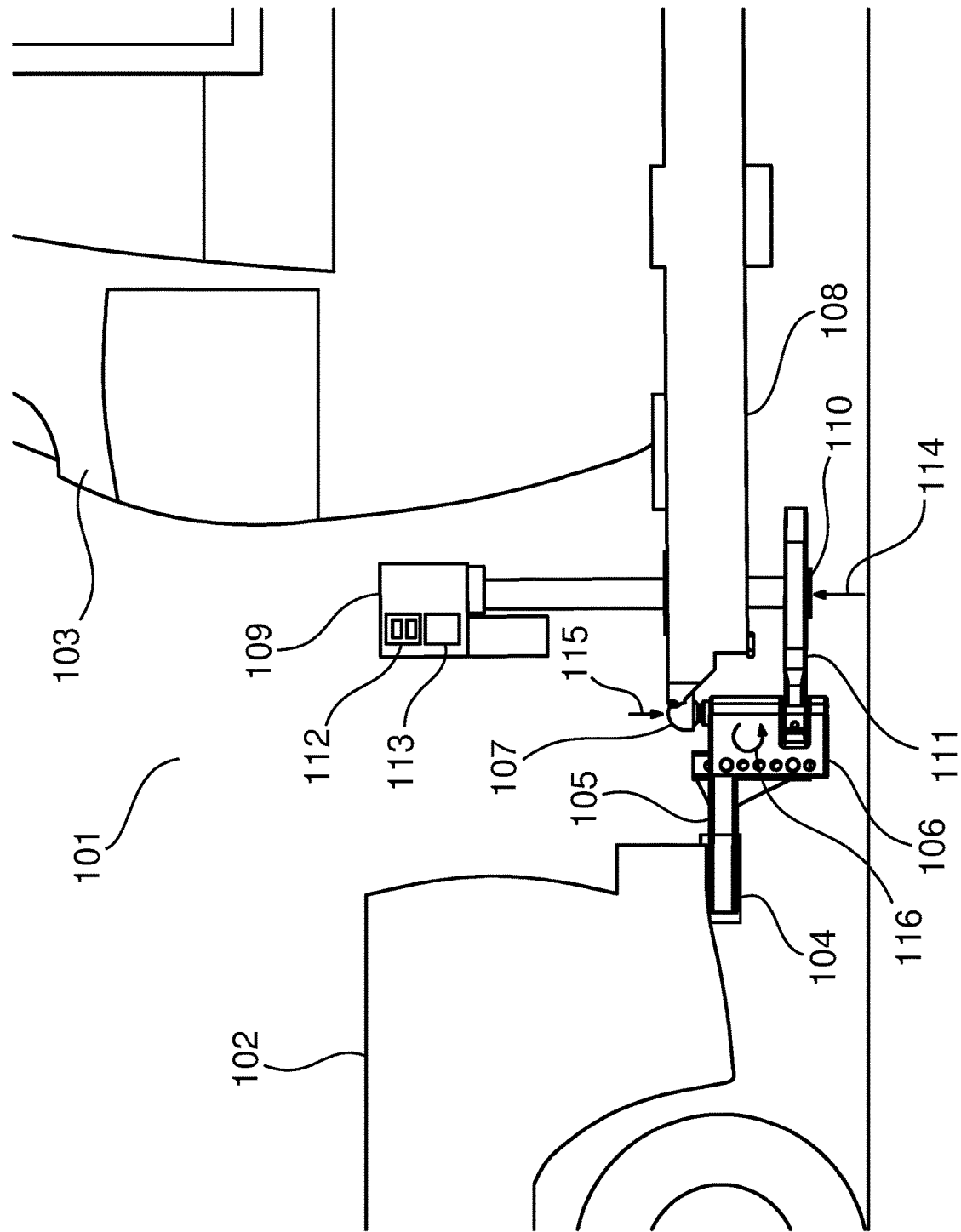
FIG. 1 is a side elevation view of a first exemplary embodiment of a weight distribution hitch system according to the present disclosure.

The following description recites various aspects and embodiments of the inventions disclosed herein. No particular embodiment is intended to define the scope of the invention. Rather, the embodiments provide non-limiting examples of various compositions, and methods that are included within the scope of the claimed inventions. The description is to be read from the perspective of one of ordinary skill in the art. Therefore, information that is well known to the ordinarily skilled artisan is not necessarily included.

Definitions

The following terms and phrases have the meanings indicated below, unless otherwise provided herein. This disclosure may employ other terms and phrases not expressly defined herein. Such other terms and phrases shall have the meanings that they would possess within the context of this disclosure to those of ordinary skill in the art. In some instances, a term or phrase may be defined in the singular or plural. In such instances, it is understood that any term in the singular may include its plural counterpart and vice versa, unless expressly indicated to the contrary.

As used herein, the singular forms "a," "an," and "the" include plural referents unless the context clearly dictates otherwise. For example, reference to "a substituent" encompasses a single substituent as well as two or more substituents, and the like.

As used herein, "for example," "for instance," "such as," or "including" are meant to introduce examples that further clarify more general subject matter. Unless otherwise expressly indicated, such examples are provided only as an aid for understanding embodiments illustrated in the present disclosure and are not meant to be limiting in any fashion. Nor do these phrases indicate any kind of preference for the disclosed embodiment.

As used herein, "hitch" is intended to have a broad meaning, referring to the hardware connecting a vehicle to a trailer including but not limited to a hitch receiver, a hitch shank, a hitch extension, a hitch head, a ball mount, a ball, and spring bars or moment bars, as context requires. It may also be used more specifically to refer to the piece that mounts underneath the vehicle, typically with bolts or welding, and contains the receiving hole for the hitch shank, as context requires.

As used herein, "forward" means toward the front of a vehicle, or the direction a vehicle travels when it is in drive and the steering wheel is in a neutral position. It also may refer to a portion of an object that faces that direction.

As used herein, "rearward" means the direction a car travels when it is in reverse and the steering wheel is in a neutral position. It also may refer to a portion of an object that faces that direction.

As used herein, "longitudinal axis" in the context of a vehicle/trailer system, is defined by a line extending from the front of a vehicle to the rear of the vehicle, through the centerline of the vehicle, and parallel to the ground. In the context of a single body, it may refer to the axis which goes through the center of the longest dimension of that body.

As used herein, "lateral axis" is orthogonal to the longitudinal axis and parallel to the ground.

As used herein, "vertical axis" is orthogonal to both the longitudinal axis and the lateral axis, or, in other words, straight up and down. Vertical axis may also apply to an axis which is not exactly straight up and down but is less than 15 degrees off.

As used herein, "centerplane" refers to a vertical plane on the centerline of a vehicle or trailer from front to back.

As used herein, "forward moment" means a twisting force that would tend to tilt the front of a vehicle down and the rear of the vehicle up.

As used herein, "attachment member" means the component of a weight distribution hitch on the vehicle side that mounts to the final connecting pieces which attach to the trailer, typically the ball mount or hitch head.

EXEMPLARY EMBODIMENTS

The present disclosure relates to weight distribution hitch systems. More particularly, it relates to weight distribution hitch systems that can be easier to attach and adjust, safer to operate, provide improved sway control, and/or dampen porpoising among other improvements.

Conventional trailer hitches typically consist of a ball/coupler arrangement, wherein a ball is attached to a tow vehicle, the coupler is attached to a trailer, and the ball fits inside the coupler to create a pivotal connection. This arrangement allows forces to be transferred between the vehicle and the trailer in the longitudinal, lateral, and vertical directions but does not allow any moments to be transferred. One problem with this arrangement is that the downward force from the coupler to the ball can overload the rear axle of the vehicle, causing it to squat. This takes weight off the front wheels, which can cause steering and/or braking issues and can also angle the headlights upward.

One way to prevent this is to use a weight distribution trailer hitch that can transfer a moment between the trailer and vehicle. A negative moment in the lateral direction, or a "forward moment," takes a load off the rear axle of the vehicle and distributes it to the front axle. This reduces the squat of the vehicle.

However, typical weight distribution hitches can be tedious to hook up and adjust. They involve many connections including multiple steps at each connection and even raising and lowering the trailer multiple times. Standard weight distribution hitches have two spring bars that extend from the back of the vehicle along the frame of the trailer. These bars are used to create a forward moment on the hitch that distributes the weight toward the vehicle's front tires. In order to do that, they are attached to the frame of the trailer under extreme stress, typically with chains. The length of the chains and/or the angle of the ball mount of the hitch must be adjusted so, when the trailer is connected, the correct moment is applied. To verify it is correct, measurements must be taken and compared to the system in an unloaded state. This is typically the distance between the front bumper and the ground. The adjustment step cannot be performed while the weight distribution hitch is connected, so everything must be disconnected each time an adjustment must be made in a tedious trial and error process. This can be fairly often if items are being added or removed from the trailer, the vehicle, or additional trailers in a double-tow scenario. Additionally, the user typically steps over the hitch many times during each setup, which can be hazardous.

The preferred embodiment of the disclosed system greatly reduces the complexity of the setup and adjustment process by reducing the number of parts, simplifying the connection process, allowing adjustments to be made without disconnecting any brackets or couplers, and by allowing a user to complete the setup on a single side of the hitch. Further, adjustments can be made without raising and lowering the trailer multiple times. Because there are no chains or chain brackets, there are fewer parts resulting in cost savings. Costs can be further reduced because many of the remaining parts can be smaller, such as the moment bar and the attachment member. The preferred embodiment can also improve safety by allowing the entire process to be completed on one side of the trailer.

The disclosed system is useful on many types of connections between a vehicle and a trailer where the trailer imposes a downward force on the rear of the vehicle, such as a ball and coupler hitch or a pintle hitch. In the preferred embodiment, a vehicle has a rear mounted hitch with a ball, and a trailer has a frame mounted coupler which latches onto the ball. In one embodiment, a hitch shank and/or a ball mount has holes in a vertical row allowing the ball to be adjustable relative to the ground. In other embodiments, the ball may be adjustable relative to the ground with other adjustable mechanisms, or it may be fixed. In one embodiment, pins or bolts may be used connect the ball mount to the hitch shank.

In a preferred embodiment, the moment bar extends from the attachment member rearward toward the trailer. In one embodiment, the moment bar is connected to the lower rear portion of the ball mount such that it may impose a moment on the vehicle about a lateral axis. The moment bar may be hingedly connected to the ball mount about a vertical axis so it can rotate side to side as the vehicle goes around corners.

One advantage of the preferred system is that the single moment bar is not only easier to connect than dual moment bars, but it is much shorter, allowing for less material and cost savings. The moment bar may be installed on both the vehicle side and the trailer side while the user is in a single position. Also, because there is preferably a single moment bar, which typically lies substantially on the centerline of the vehicle, the imposed moment is evenly distributed over the front tires of the vehicle. While it is possible for dual moment bars which are evenly spaced and have the same applied forces to achieve a balanced moment on the vehicle, any discrepancy in the angle of the moment bars or the tension in the chains will impose an imbalanced moment on the vehicle.

In one embodiment, the hinged moment bar connection may also serve as sway control for the trailer. Rather than rotating freely, the hinged connection may be resistive to being rotated, for example by promoting friction between the moment bar and the ball mount. Steel on steel is ideal in some applications of the invention because of its high coefficient of friction, but it comes with the drawback of corroding. Passive materials, which are less corrosive, such as brass, bronze, brake pad materials, and stainless steel, also may be used. Many of those materials, however, have less friction than steel. Some embodiments include replaceable wear plates, which allow a user to replace them if they become too worn. Alternatively, one or more springs are incorporated into the design to bias the moment bar to the neutral position, i.e., extending straight back from the ball mount. In this way, the moment bar can pivot, but that pivoting is resisted, and the moment bar is biased back to the neutral position. Incorporating a resistance into the pivoting of the moment bar can help keep the trailer from swaying from side to side as the resistance inhibits the lateral movement of the trailer.

The rearward end of the moment bar is configured to receive an upward force. Because the forward end is fixed on a vertical axis, the upward force on the rearward end creates a moment on the attachment member. In one embodiment of the invention, the force is created by a lifting mechanism which is secured to the frame of the trailer. In a preferred embodiment, the lifting mechanism is a jack which has a bearing surface disposed near the bottom of a shaft that extends from the trailer frame at least as far as the moment bar. One benefit of using a jack is that it may also be used as a support for the trailer. In one embodiment, the jack is capable of being loaded in both tension and compression: tension while it is lifting on the moment bar and compression while it is supporting the trailer.

The system also preferably includes a bearing surface on the lifting mechanism designed to allow it to lift on the moment bar. In one embodiment, a jack has a bearing plate fixed to the shaft at a location at least as low as the bottom of the moment bar. In other embodiments, the bearing surface is spherical or another curved shape. The bearing plate may attach to the outer circumference of the shaft of a jack and surround the shaft, or it may attach to one side. In the preferred embodiment, the bearing surface of that plate is convex, which allows it to avoid point forces on the moment bar that the edge of a flat plate would create as the vehicle travels over a hill causing the two bearing surfaces to be unparallel. In one embodiment, the moment bar has a concave surface to better mate with the convex surface of the jack. In another embodiment, the mating surfaces are a ball and coupler similar to the ball and coupler connecting the hitch and trailer frame.

The moment bar preferably also contains an aperture allowing it to go around the shaft of the jack or a portion of the jack or other lifting mechanism. This allows the bearing surface of the moment bar to surround the jack. This has many benefits. First, it allows the tension in the shaft of the jack to be axial rather than eccentric as it would if the bearing surface were only on one side of the jack. It also locks the moment bar onto the jack which allows it to be stored on the trailer rather than the vehicle. It also prevents theft. In one embodiment, the aperture is oval or an elongated slot. This gives the moment bar more movement respective to the jack than with a circular aperture, which helps a user manipulate the moment bar into and out of its installed position in the attachment member.

In one embodiment, an indicator or switch tells the user or a controller when the vehicle or trailer is level. The level may be controlled in many ways, including visually, mechanically, and with sensors and controlling circuitry. To control it visually, a user, after hooking the vehicle to the weight distribution hitch and trailer, may increase the tension in the jack while watching the level of the vehicle or the trailer look level. Mechanically, the user may increase the tension in the jack until a level switch or scale cuts the power to the jack, or until a scale or level indicator indicates that the user should stop adding tension to the jack. Sensors and controlling circuitry may be used to add or remove tension from the jack, which may comprise a control unit within the vehicle, on the jack, or on a personal device such as a phone. In any case, the control unit may connect to a level or a load sensor, and the on and off switch to the jack. Limit switches may be included on the level indicator or load sensor, which communicate to the motor of the jack to start or stop. In one embodiment, limit switches are located on the level or load sensor. In another embodiment, limit switches are programmed into a control unit.

The additional load from the lifting mechanism can be measured in many different places. It may be measured within a trailer jack, the trailer coupler, or on the hitch, as disclosed in patent number U.S. Pat. No. 7,960,659 B2, which is hereby incorporated by reference in its entirety. It may also be measured within the ball of the hitch as disclosed in US patent publication number US 2006/0290102 A1, which is hereby incorporated by reference in its entirety.

In one embodiment of the invention, the load on the moment bar is measured by the tension in the jack as measured by the resistance to an electric motor controlling the jack. This is typically done by measuring the amperage to the motor, as the amperage is directly related to the load on the motor. The amperage meter wirelessly communicates via Bluetooth or other wireless means to a controlling device, such as a phone. The controlling device may have access to data determining what the maximum load on the motor should be either locally or through network communication. The user device communicates wirelessly with a power switch on the motor and stops the motor when the desired load is reached. In other embodiments, a scale or level replaces the amperage meter as the measuring device that communicates with the user device.

Another advantage of the preferred system is that it can be adjusted when the vehicle is in motion. Weight distribution hitches maintain a desirable forward moment on the vehicle that is typically dependent on the vehicle and trailer being on flat ground. When a vehicle with a weight distribution hitch goes over a hill or a bump, the forward moment from the device can be undesirable. If the vehicle goes over a hill, the moment will be decreased causing the front of the vehicle to aim upward. This is especially dangerous if the vehicle is driving at night, and the headlights are pointed upward as the driver needs to see downward. Conversely, if the vehicle drives through a depression in the ground, the moment will be increased and will force the front of the vehicle downward. This can be especially dangerous if the pressure on the rear wheels is reduced to the point that they lose traction, or even worse, if the rear wheels are lifted off the road.

One embodiment includes a weight distribution hitch that can prevent these problems by changing the weight distribution as the vehicle travels over uneven ground. In one embodiment, a load sensor indicates a change in load as the vehicle and the trailer are on uneven ground. The load sensor may communicate wirelessly with a control unit, such as a phone or built-in processor, which may communicate with the motor on the jack to adjust accordingly. When the trailer is going over a bump or hill, the load sensor will communicate a decreased tension on the jack to the control unit which will communicate to the motor to increase tension on the jack, which will help keep the vehicle pointed level, and vice versa. Then, when the vehicle returns to flat ground, the sensor will communicate an increased tension which will result in the control unit reducing the tension in the jack to normal, and vice versa.

The system may also be used to prevent or reduce trailer porpoising, which is the up and down oscillation of a trailer and vehicle, in response, for example, to hitting a bump. This can be similar to a slinky rising and falling as it is held at each end. A load sensor or level sensor in the weight distribution hitch or jack will sense an increase or decrease of load or level as the vehicle/trailer system oscillates. In one embodiment, a load sensor in the jack is wirelessly coupled to a control unit, such as a phone or built-in processor, in the vehicle. As the control unit receives data that the trailer is porpoising, or is in a state that could cause porpoising, the control unit may communicate to the motor of a jack to increase tension or decrease tension as the system may require to prevent the porpoising. When the weight distribution hitch is in a higher than normal position, a decreased tension will help lower its position. When the weight distribution hitch is in a lower than normal position, an increased tension will raise its position. However, to prevent porpoising, the control unit may be configured to decrease tension as the hitch is in a lower than normal position but raising upward, and to increase tension as the hitch is in a higher than normal position but falling. This way, the weight distribution hitch absorbs the energy of the vehicle/trailer system and acts as a porpoising dampener.

The system may be used with other sensors and computers to automatically evaluate and adjust various aspects of the weight distribution system. The following patents and published patent applications describe the use of sensors to evaluate a towed load and are incorporated herein by reference in their entireties: U.S. Pat. No. 9,290,185 titled "Determining Haul Weight" to Hall et al.; U.S. Pat. No. 9,956,965 titled "Tongue Weight Determination" to Hall et al.; U.S. Pat. No. 10,142,798 titled "Arrangement for, and Method of, Locating a Mobile Device in a Venue by Inferring Transit Timer Values of Ranging Signals Received by the Mobile Device in a Time Difference of Arrival (TDOA)-Based Ultrasonic Locationing System" to Calvarese et al.; U.S. Pat. No. 10,214,222 titled "Determining Weight of a Vehicle in Reverse Gear" to Hall et al.; U.S. Pat. No. 10,274,360 titled "Mobile Device Vehicle Weight Determination" to Hall et al.; U.S. Pat. No. 10,543,846 titled "Determining Vehicle Power" to Hall et al.; U.S. Pat. No. 10,543,725 titled "System for Determining Towing Equipment Compatibility" to Hall et al.; US 2018/0215358 titled "Auto Gain Adjusting Trailer Brake Controller" to Hall et al.; US 2018/0111619 titled "Determining Gross Combined Weight" to Hall et al.; US 2019/0152468 titled "System for Automatically Adjusting Drive Modes" to Hall et al.; US 2019/0178701 titled "Monitoring System for Determining a Vehicle Safety Setting Based on Weight" to Hall et al.; US 2019/0202251 titled "System for Optimizing a Trailer Path" to Hall et al.; and US 2019/0210418 titled "Trailer and a Tow Vehicle Path Optimization" to Hall et al.

Moment bars are typically connected to the hitch of a vehicle at a portion of the hitch located below the ball. This process may be time consuming and involve multiple connections. In some instances, moment bars are not removable from the hitch and remain attached to the vehicle as long as the hitch is attached. This makes the hitch very heavy, unsightly, and also creates a potential hazard for people walking near the rear end of the vehicle, particularly when the vehicle is not attached to the trailer, who may not see the moment bars protruding from the hitch. One embodiment creates an easy to connect and disconnect moment bar apparatus to alleviate these problems.

In one embodiment, a barrel coupling comprising nesting cylinders provides a simple connection between the hitch and the moment bars. In one embodiment, the hitch has an outer cylinder protruding downward below the hitch ball. The moment bars comprise an inner cylinder which is inserted into the outer cylinder providing a connection which pivots about the z-axis and can translate a moment from the moment bars to the hitch. In an embodiment, the outer cylinder comprises a horizontal groove on its inner surface allowing a spring clip on the inner cylinder to hold the inner cylinder inside the outer cylinder without falling out.

The connection between the inner and outer cylinders can provide not only a moment inducing connection, but a sliding friction which may assist with sway control for the trailer. The materials and the gap between the cylinders may be varied per the needs of the system. In one embodiment, the difference between the outer diameter of the inner cylinder and the inner diameter of the outer cylinder is less than 50/1000 of an inch. In another embodiment, the difference is less than 30/1000 of an inch. In a preferred embodiment, the difference is less than 10/1000 of an inch, which provides more friction for sway control and less movement during moment transfer than a larger gap.

The size of the mating surface between the inner cylinder and the outer cylinder also affects the amount of friction in the barrel coupling and thus sway control. Preferably, the inner cylinder has a diameter of at least 2 inches. Even more preferably, the inner cylinder has a diameter of at least 2.5 inches. Yet even more preferably, the inner cylinder has a diameter of at least 3 inches. Concerning depth, the inner and outer cylinders have a mating surface that is at least 1.5 inches tall. More preferably, the inner and outer cylinders have a mating surface that is at least 2 inches tall. Yet even more preferably, the inner and outer cylinders have a mating surface that is at least 2.5 inches tall.

Various materials provide different benefits for the sliding surface between the inner and outer cylinders. In one embodiment of the invention, both surfaces are made from steel, which is inexpensive to produce, long lasting, and also provides a higher amount of friction than many other metals. In another embodiment, a liner may be applied to one of the surfaces, which may be permanent or replaceable, which provides more or less friction. In a preferred embodiment, the liner is bronze. In another embodiment, the liner is made from brake pad material. In another embodiment, for applications requiring less friction, the liner is oil impregnated bronze. In other embodiments, the surfaces of the inner and outer cylinders are made from other metals or hard substances.

Another benefit is that a single hitch can comprise multiple ball sizes and also be used for weight distribution. This makes it much cheaper and easier for users to pull multiple trailers that require different sizes of balls and that may or may not use weight distribution. With other hitch systems, the user may have different sizes of balls, or they may have weight distribution, but not both.

One embodiment includes a dual coupler ball, which may be inserted through the barrel coupler previously mentioned such that one ball extends above the barrel coupler and the other ball is hidden inside the cylinder. In this embodiment, the cylinder on the moment bar may also be hollow so it does not interfere with the hidden ball. The dual coupler ball may be held in place with a removable pin that extends through the side of the hitch.

A cam on the foot of the jack reduces side forces and prevents the jack from binding. A cam at the moment bar jack interface reduces sliding and wear as the moment bar is raised.

Now referring to FIG. 1, it shows a first embodiment using an electric jack as a lifting mechanism. A weight distribution system 101 couples a vehicle 102 to a trailer 103. The system comprises a hitch receiver 104 connected to the underside of the vehicle 102. Extending rearwardly from the hitch receiver 104 is a shank 105, a ball mount 106, and a ball which is partially hidden under the coupler of the trailer 107. The hitch receiver 104, shank 105, ball mount 106, and ball are all connected to the vehicle. On the trailer side of the system are a coupler 107, a frame 108, and a jack 109. The jack also contains a foot 110. A moment bar 111 may be a part of the truck side of the system or the trailer side of the system depending on user or manufacturer preference. The jack has at least two positions, an up position and a down position. While the foot is down, the jack supports the weight of the trailer and its shaft is in compression. While it is up, the foot abuts the underside of the moment bar 110 and the shaft is in tension between the moment bar 111 and the frame 108. The jack also has user controls 112, which typically includes a switch or buttons to move the jack between position one and position two, or to an intermediate position. That jack may be configured to weigh the load on the jack and display the load on a load indicator 113. It may also communicate the load to a controller, such as a phone.

As depicted in FIG. 1, when the system is in use to distribute the load forward on the vehicle, an upward force 114 increases the tongue weight 115 and imposes a moment 116 on the ball mount 106, which translates through the vehicle 102, adding a downward force to the front tires and an upward force to the rear tires, balancing the vehicle.

Figure 2:
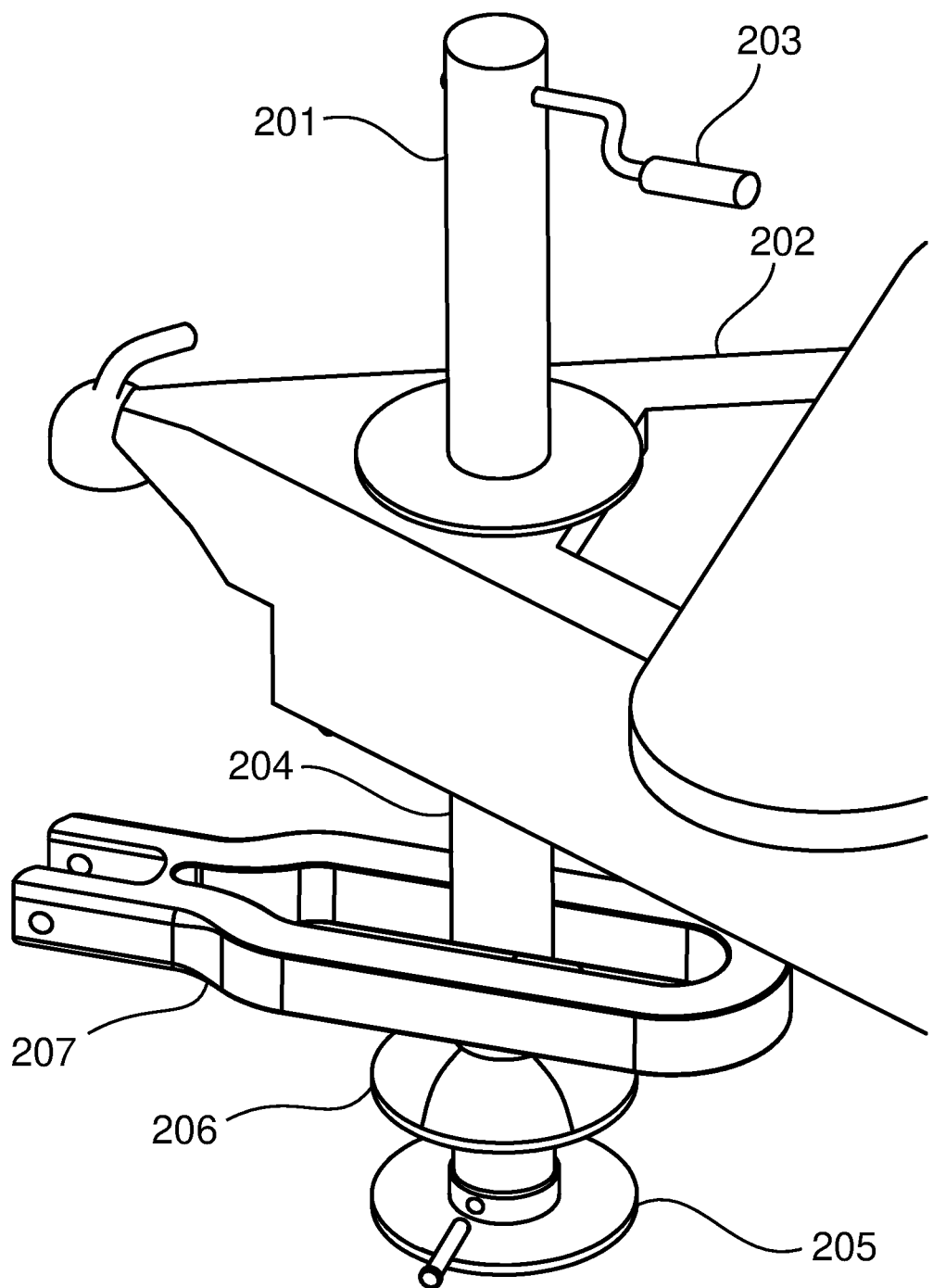
FIG. 2 is a perspective view of a second exemplary embodiment of a weight distribution system including a moment bar with an aperture according to the present disclosure.

Now referring to FIG. 2, which shows a second embodiment that includes a bearing plate on the jack. A jack 201 is mounted to the frame of a trailer 202. The jack includes a hand crank 203 to raise and lower the shaft 204. A foot 205 caps the bottom of the shaft 204 and gives a jack a stable bearing surface for the ground. A bearing plate 206 is attached to the shaft further up from the foot. In some embodiments, the bearing surface is flat, however, the depicted embodiment shows a convex surface. When the jack is in tension between the frame 202 and the moment bar 207, the convex shape of the bearing plate allows the abutting surfaces to roll slightly when the vehicle goes over bumps, rather than creating extreme point loads that an edge of a flat plate would create when the two surfaces are not parallel.

FIG. 2 also illustrates the way the moment bar 207 is locked onto the jack 201. In this configuration, the moment bar may be stored on the trailer with less risk of theft. This is also beneficial to users who would rather not have a moment bar or bars attached to their vehicles. However, other embodiments use moment bars that are easily removable from the jack, such as an open-ended bar that resembles a tuning fork.

Figure 3:
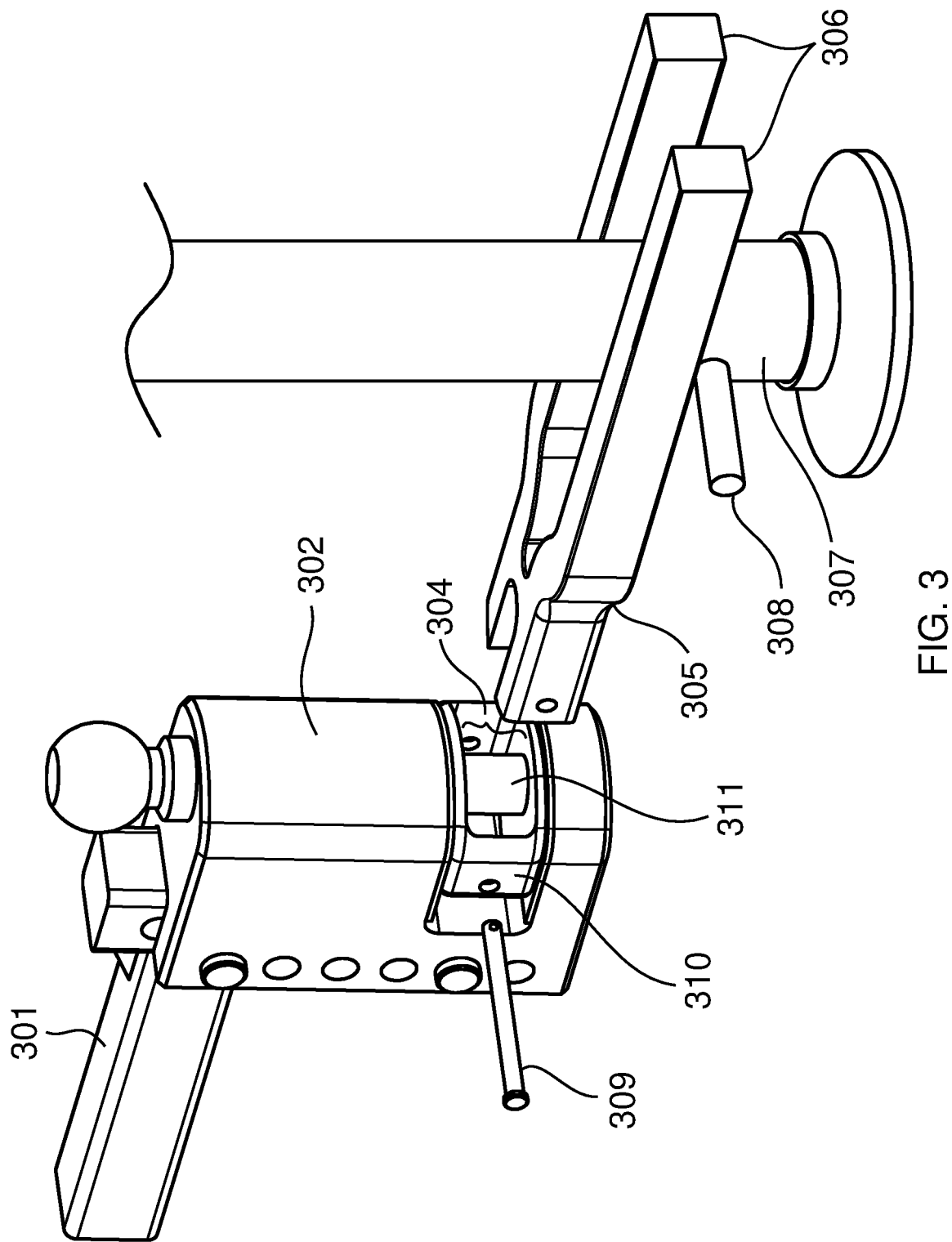
FIG. 3 is a perspective view of a third exemplary embodiment of a weight distribution hitch system according to the present disclosure.

Now referring to FIG. 3, which illustrates a third embodiment of the way the system may attach to a ball mount and an alternative configuration to abut the tension member. A hitch shank 301 is pinned to a ball mount 302 through a series of holes allowing the attachment to be adjustable. The upper end of the ball mount is attached to a ball 303 for coupling to a trailer, whereas the lower end of the ball mount includes a socket 304 designed to receive a moment bar 305. In this configuration, the socket 304 pivots about a central pin 311. In other configurations the socket does not rotate, but the moment bar rotates within the socket. The socket 304 includes an upper bearing surface and a lower bearing surface which translate the moment from the moment bar 305 to the ball mount 302. They also may provide friction to assist with sway control for the trailer. The upper bearing surface and lower bearing surface may be made of steel, for ease of manufacturing and cost, but they may also be made of other materials in order to provide different properties for the connection, such as rust prevention and friction. A pin 309 keeps the moment bar 305 from slipping out of the socket 304.

In the embodiment of FIG. 3, the moment bar 305 has two prongs 306 which abut a bearing surface on the jack 307. In the depicted embodiment, the bearing surface is provided by pegs, however, it may also be another shape such as the bearing plate of FIG. 2, D-rings, or other.

Figure 4:
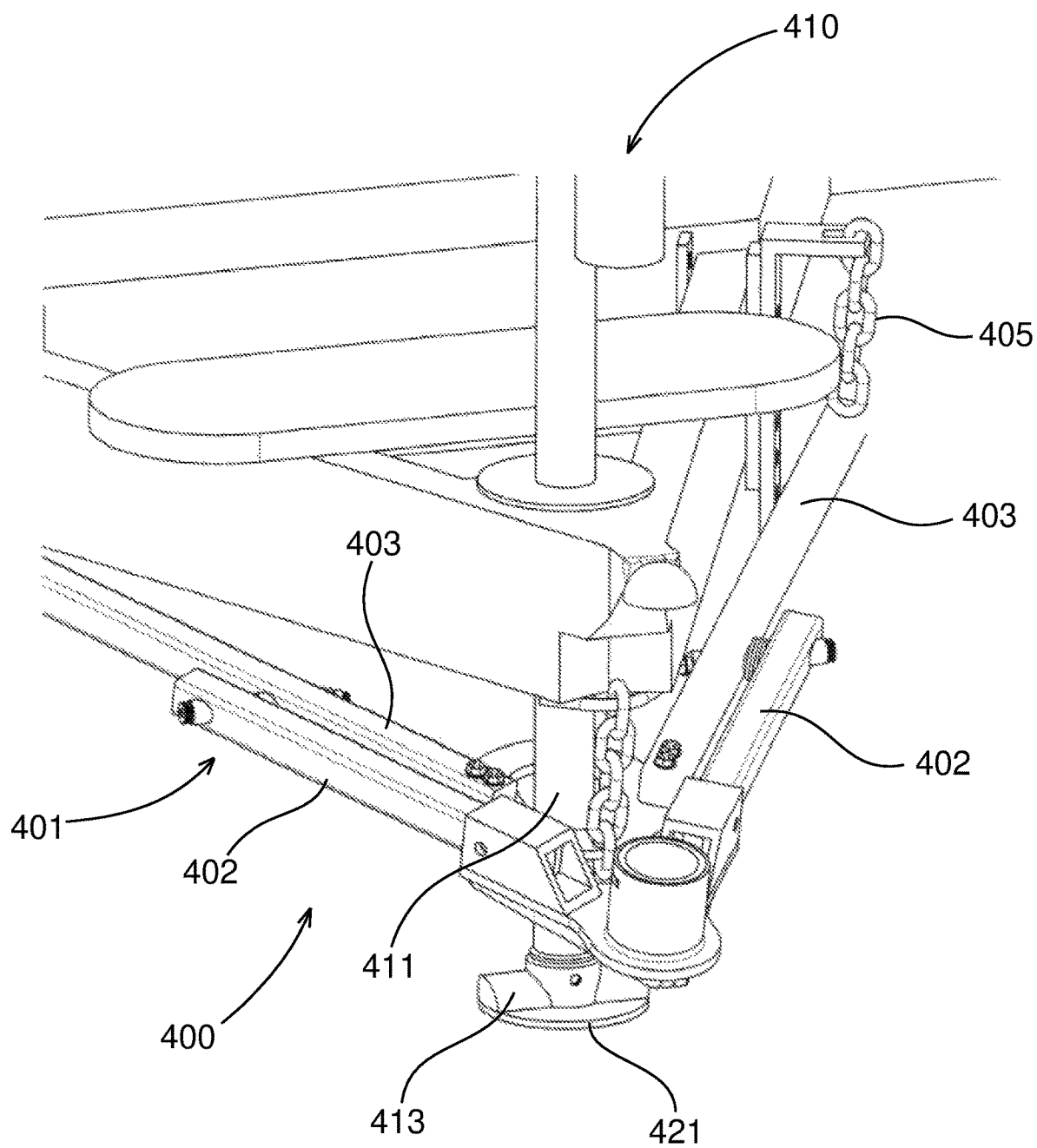
FIG. 4 is a perspective view of a fourth exemplary embodiment of a weight distribution hitch system according to the present disclosure.
Figure 5:
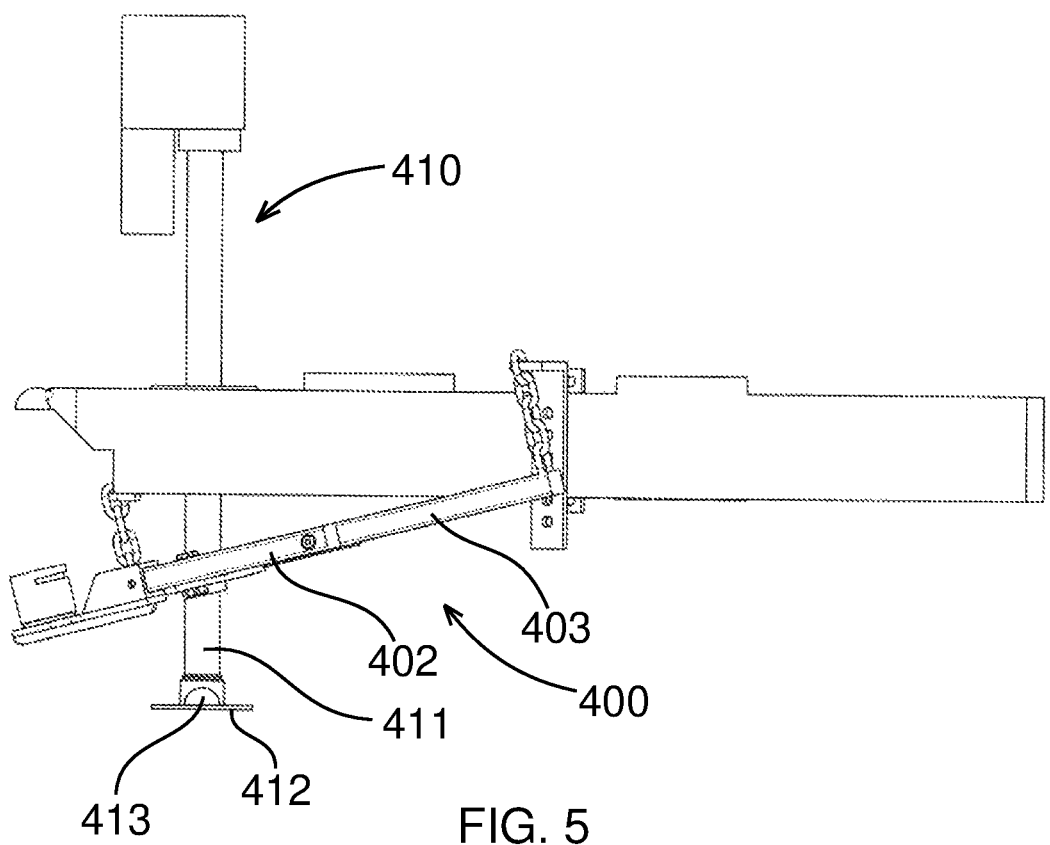
FIG. 5 is a side view of the fourth exemplary embodiment.
Figure 6:
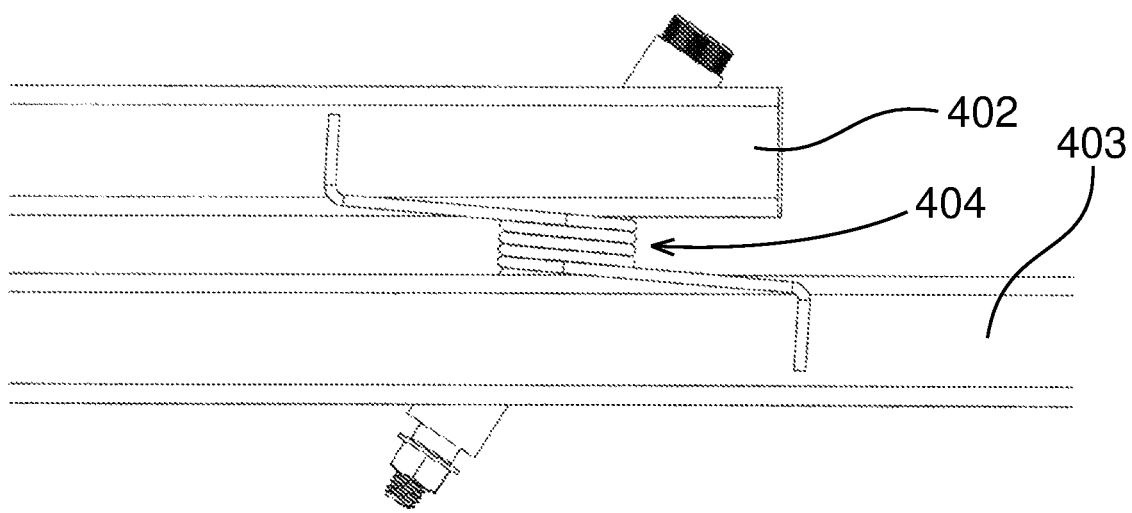
FIG. 6 is a bottom view of the fourth exemplary embodiment of a weight distribution hitch system according to the present disclosure.

Now referring to FIGS. 4 to 6, a fourth exemplary embodiment of a weight distribution hitch system 400 is shown. The system uses a two-part moment bar 401 with a first moment bar segment 402 that attaches to a coupling 406 that attaches to the vehicle hitch (not shown) and a second moment bar segment 403 that is attached to the trailer via bar chain 405. The first segment 402 and second segment 403 are connected by spring 404. Spring 404 applies a biasing force on the second moment bar segment 403 such that it applies an upward force on the coupling 406 and vehicle trailer hitch. The spring 404 also provides flexibility to the moment bar 401.

Figure 7:
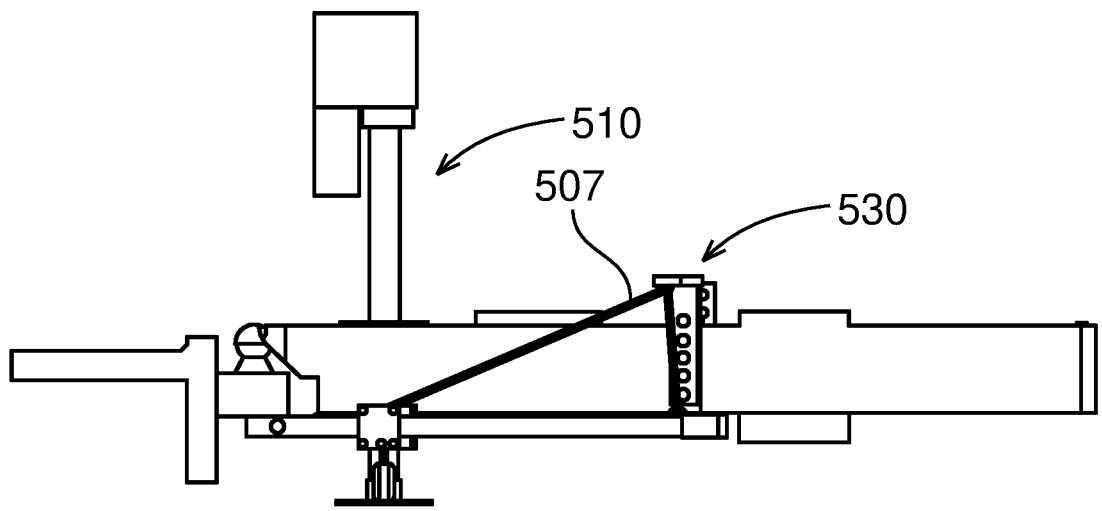
FIG. 7 is a side view of a fifth exemplary embodiment of a weight distribution hitch system according to the present disclosure.

Now referring to FIG. 7, a fifth exemplary embodiments, respectively of a weight distribution hitch system 500 is illustrated. Moment bar 501 is used to apply a moment force on a vehicle via a trailer hitch 520. The force applied by moment bar 501 is adjusted using cable 507. In various exemplary embodiments, the cable 507 is routed through guides 531 along the center of the trailer frame and/or guides 532 attached to the sides of the trailer frame. The guides 532 may be part of brackets 533 attached to the trailer.

Figure 8:
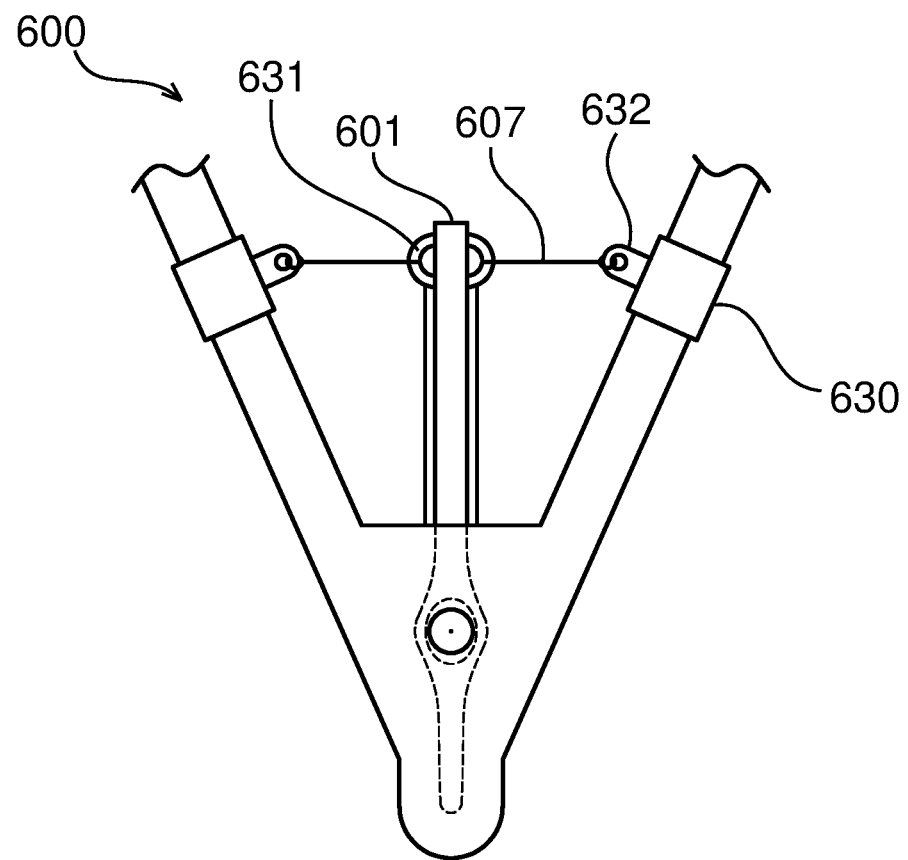
FIG. 8 a top view of a sixth exemplary embodiment of a weight distribution hitch system according to the present disclosure.

Now referring to FIG. 8, a sixth exemplary embodiments, respectively of a weight distribution hitch system 600 is illustrated. Moment bar 601 is used to apply a moment force on a vehicle via a trailer hitch 620. The force applied by moment bar 601 is adjusted using cable 607. In various exemplary embodiments, the cable 607 is routed through guides 631 along the center of the trailer frame and/or guides 632 attached to the sides of the trailer frame. The guides 632 may be part of brackets 633 attached to the trailer.

Figure 9A:
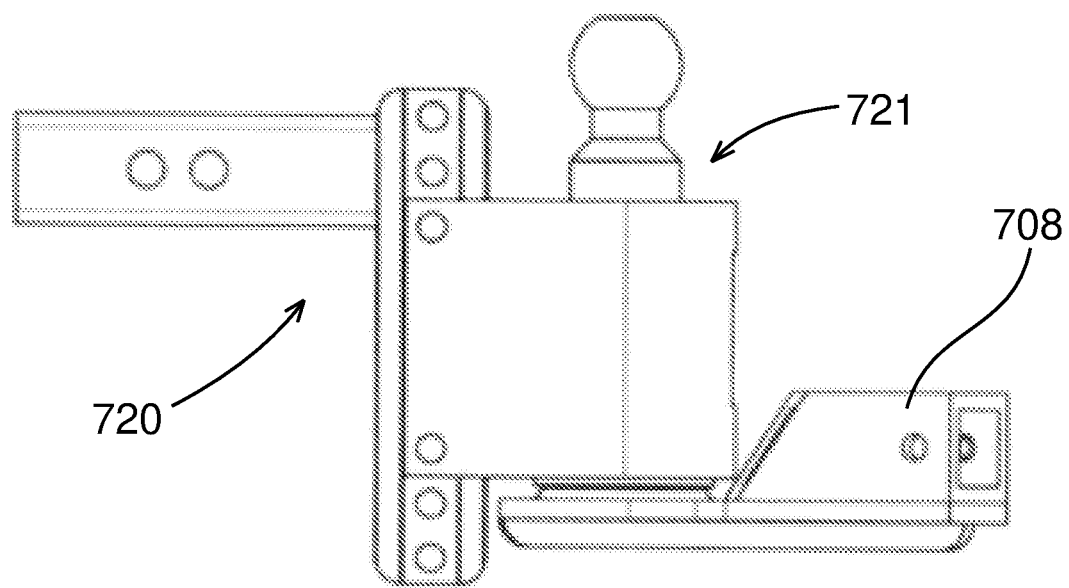
FIG. 9A is a side view of a seventh exemplary embodiment of a weight distribution hitch system according to the present disclosure.
Figure 9B:
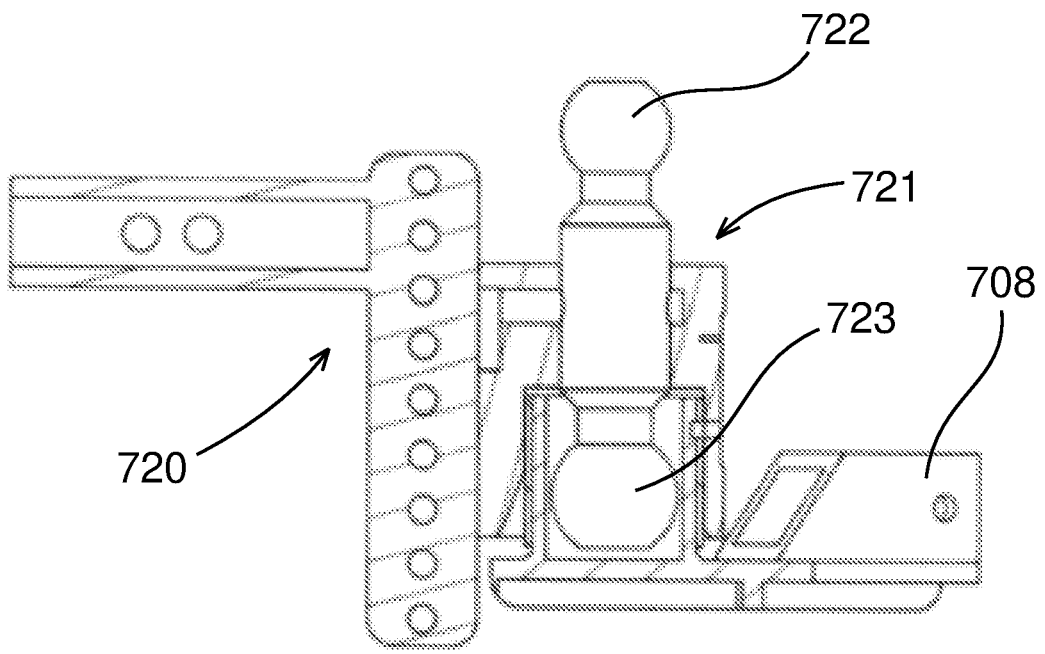
FIG. 9B is a side cross-sectional view of the embodiment of FIG. 9A.
Figure 9C:
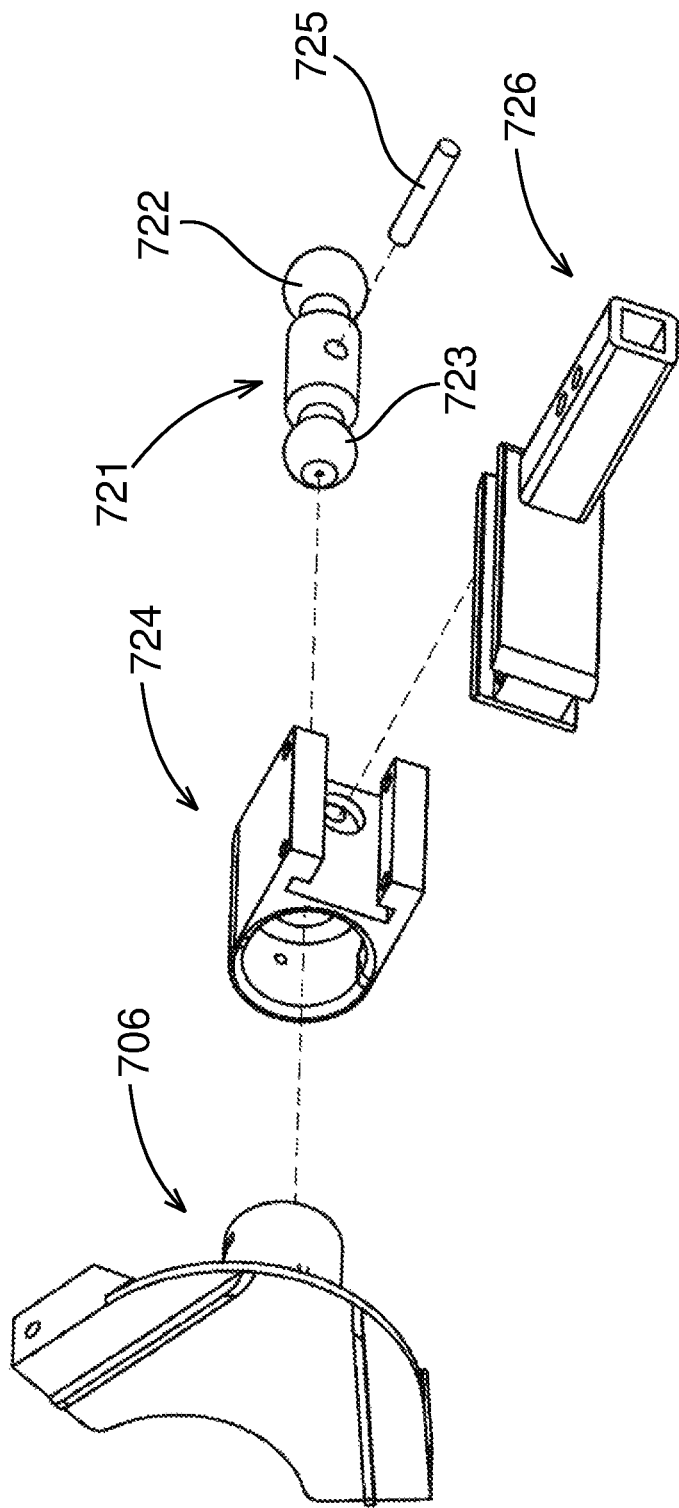
FIG. 9C is an exploded view of embodiment of FIG. 9A.

Now referring to FIGS. 9A to 9C, a seventh exemplary embodiment of a trailer hitch 720, with two interchangeable hitch balls 722 and 723. Different trailers may use different size hitches. Hitch 720 includes reversible hitch insert 721 with two different size balls 722 and 723. The hitch insert 721 may be removed from the hitch and its orientation reversed to select which hitch ball 722 or 723 is available for use. In a preferred embodiment, the hitch ball 722 or 723 not in position for use in concealed within cylindrical barrel 724 to which the moment bar(s) 701 may be attached, typically via a hitch coupling 706 that mates with the barrel 724.

Now referring to FIG. 9C, an exploded view of a trailer hitch 720 with dual hitch balls 722 and 723 is provided. The hitch 720 may be detached from the shank 726 reversible balls 721 removed to change which is in position for use. In an exemplary embodiment a pin 725 or other connector is used to secure the hitch ball mount 722 to the hitch 720.

Figures 10, 10A:
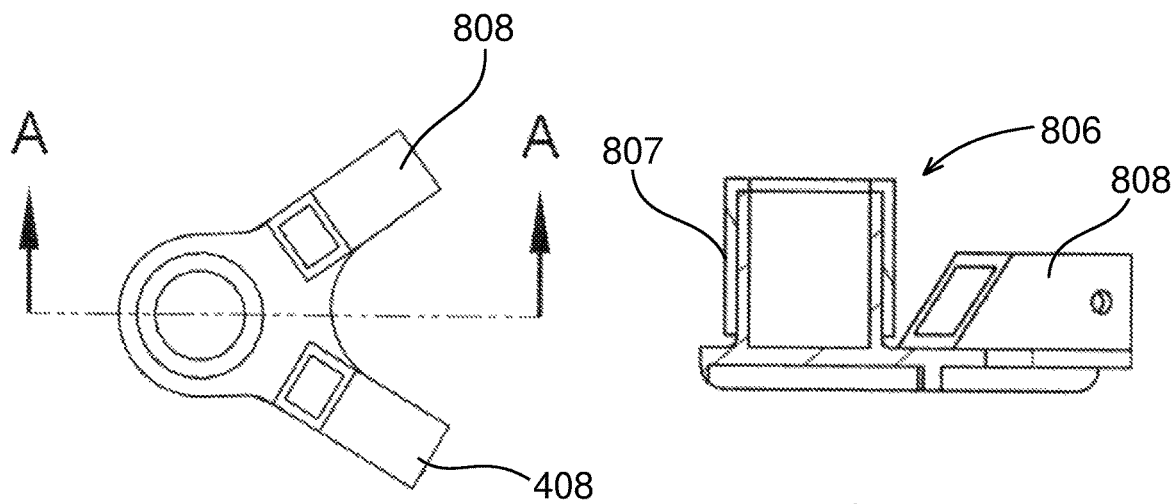
FIG. 10 is a top view of an eighth exemplary embodiment of a weight distribution hitch system according to the present disclosure.
FIG. 10A is a cross-sectional view of the embodiment of FIG. 10 taken along the line A-A in FIG. 10.
Figures 10B, 10C:
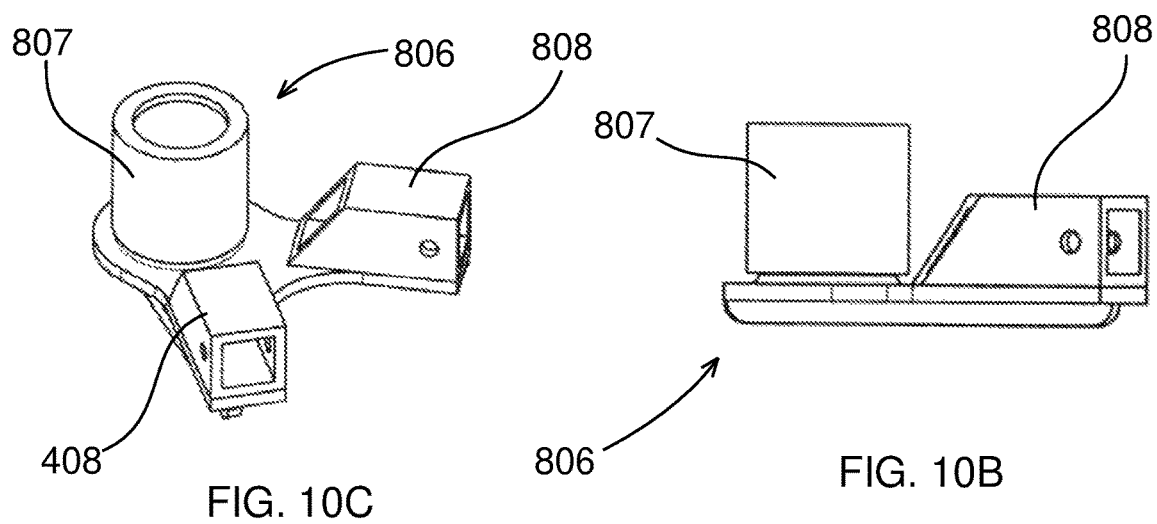
FIG. 10B is a side view of the embodiment of FIG. 10.
FIG. 10C is a bottom view of the embodiment of FIG. 10.

Now referring to FIGS. 10 to 10C, an eighth exemplary embodiment of a hitch coupling 806 is illustrated. Moment bars (not shown) connect to the coupling via brackets 808 and, in an exemplary embodiment, are secured thereto with a pin (not shown). The coupling 806 also includes a barrel 807 that attaches to the hitch (not shown) on the vehicle.

Now referring to FIGS. 11, a ninth embodiment of a weight distribution hitch system that uses the trailer jack to apply the moment force is shown. The jack 910 includes a shaft 911 with a bearing plate 912 near its foot. When the jack 910 is raised, the shaft 911 is retracted and the bearing plate 912 contacts the moment bar applying a force through the bearing plate 912.

Figure 12:
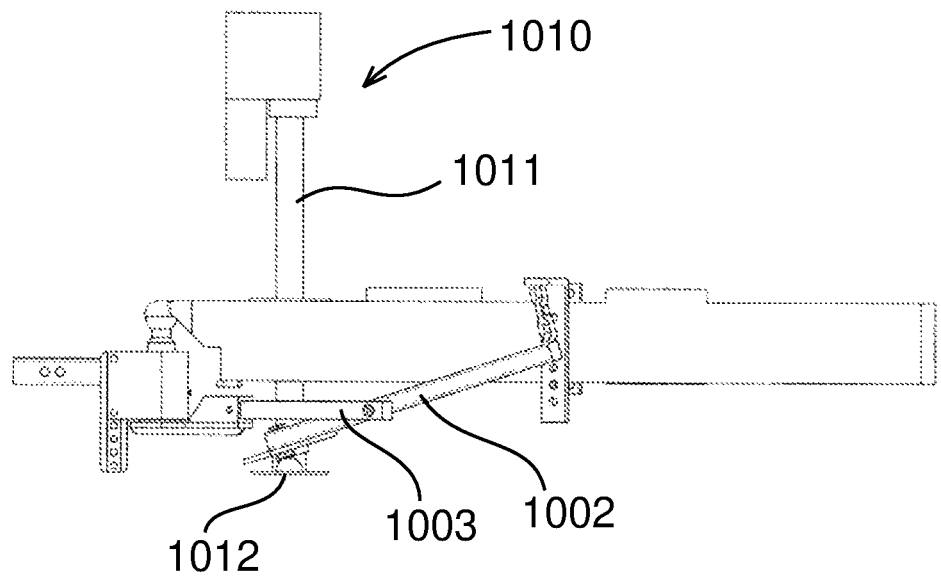
FIG. 12 is a side view of a tenth exemplary embodiment of a weight distribution hitch system according to the present disclosure.
Figure 13:
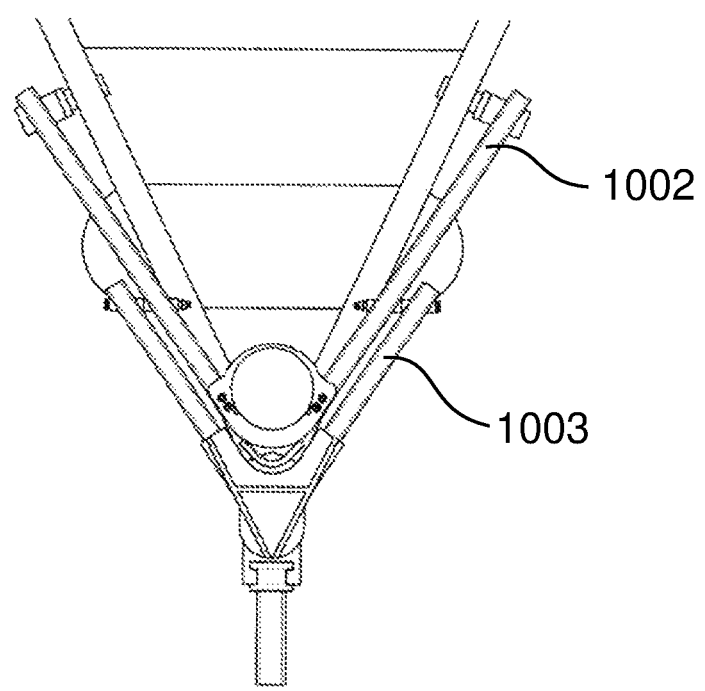
FIG. 13 is a top view of the embodiment of FIG. 12.
Figure 14:
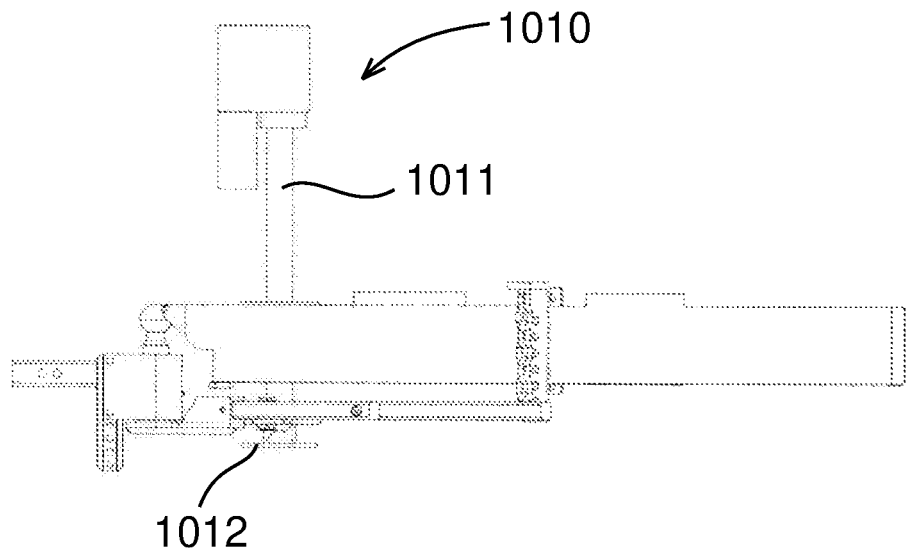
FIG. 14 is a side view of the embodiment of FIG. 12 with the weight distribution adjusted.
Figure 15:
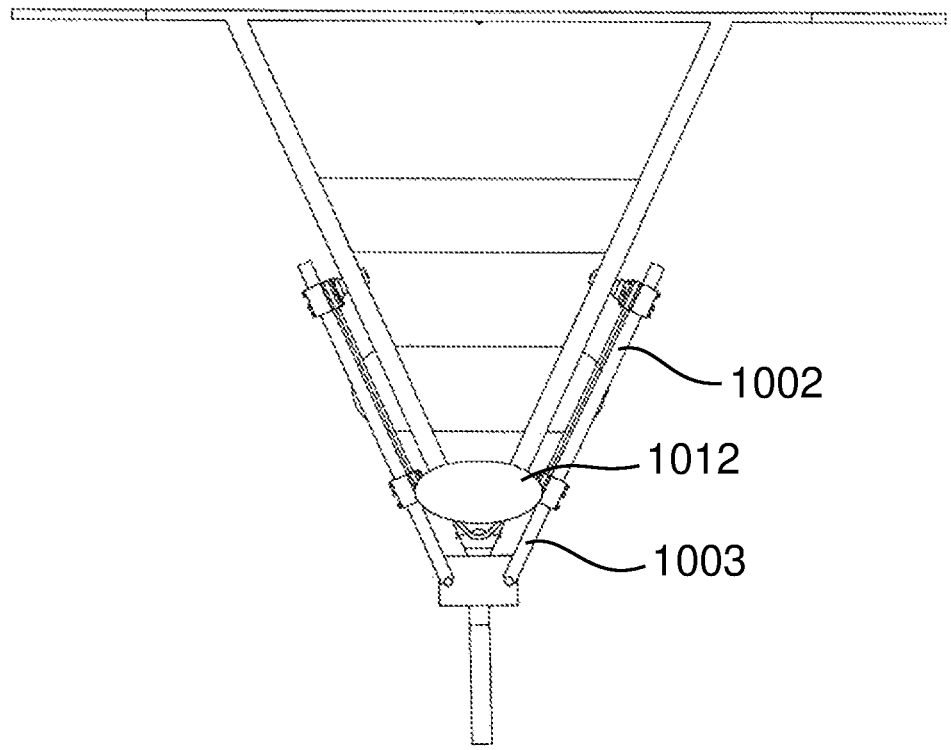
FIG. 15 is a bottom view of the embodiment of FIG. 12.

Now referring to FIGS. 12 to 15, a tenth exemplary embodiment of a weight distribution hitch system using the jack to apply the moment force. The jack shaft 1011 has a cam 1012 near the foot that contacts a first moment bar 1002 applying an upward force on the second moment bar 1003. The first and second moment bars are pivotally connected. In this embodiment, the spring bar 1009 is attached to the trailer frame by a chain 1005. Referring specifically to FIG. 13, the positions of the first moment bar 1002 and second moment bar 1003 are better illustrated. The changed positions of the moment bars 1002 and 1003 with the jack lowered and raised are illustrated by FIGS. 12 and 14, respectively.

Figure 16:
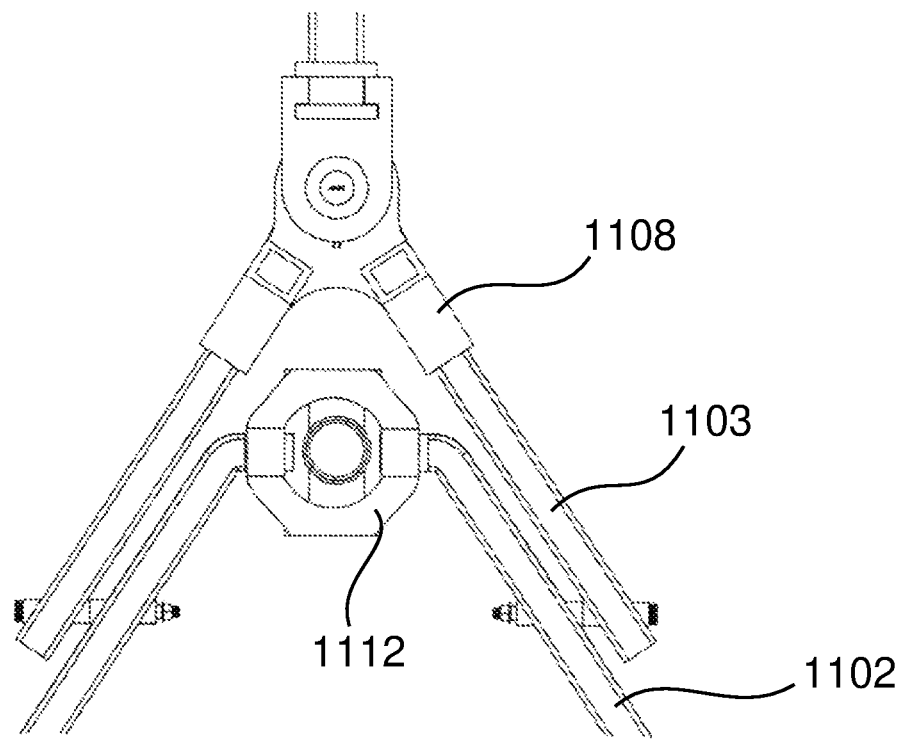
FIG. 16 is a top view of an eleventh exemplary embodiment of a weight distribution system according to the present disclosure.
Figure 17:
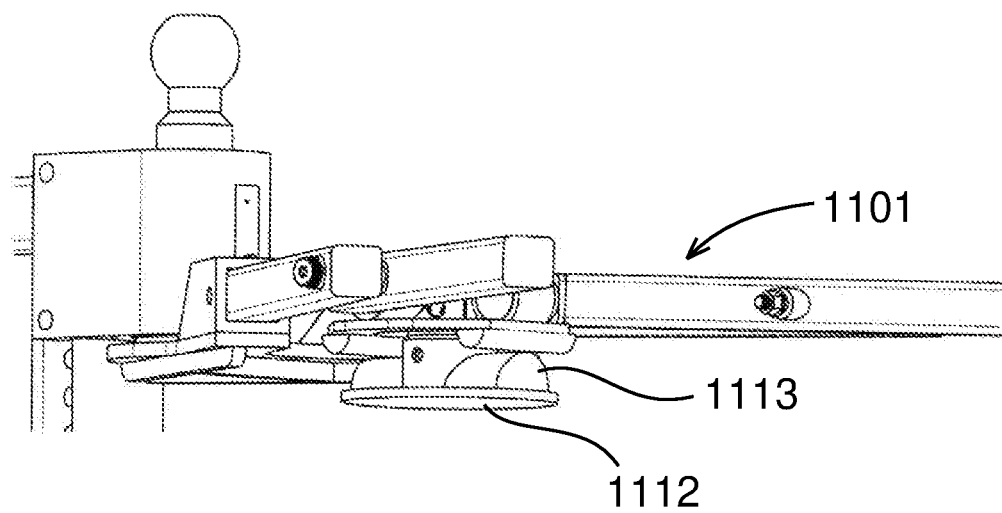
FIG. 17 is an isometric side view of the embodiment of FIG. 16.

Now referring to FIGS. 16 and 17, an eleventh exemplary embodiment, which is an alternative to the embodiment of FIGS. 12 to 15, is shown. The bearing plate 1112 comprises rounded cam 1113 that maintains consistent contact with the moment bars as the vehicle and trailer traverse rises and drops in the road without transferring the load to a front or back edge as would occur with direct contact on the bearing plate 1112 or using a more rectangular cam.

Figure 18:
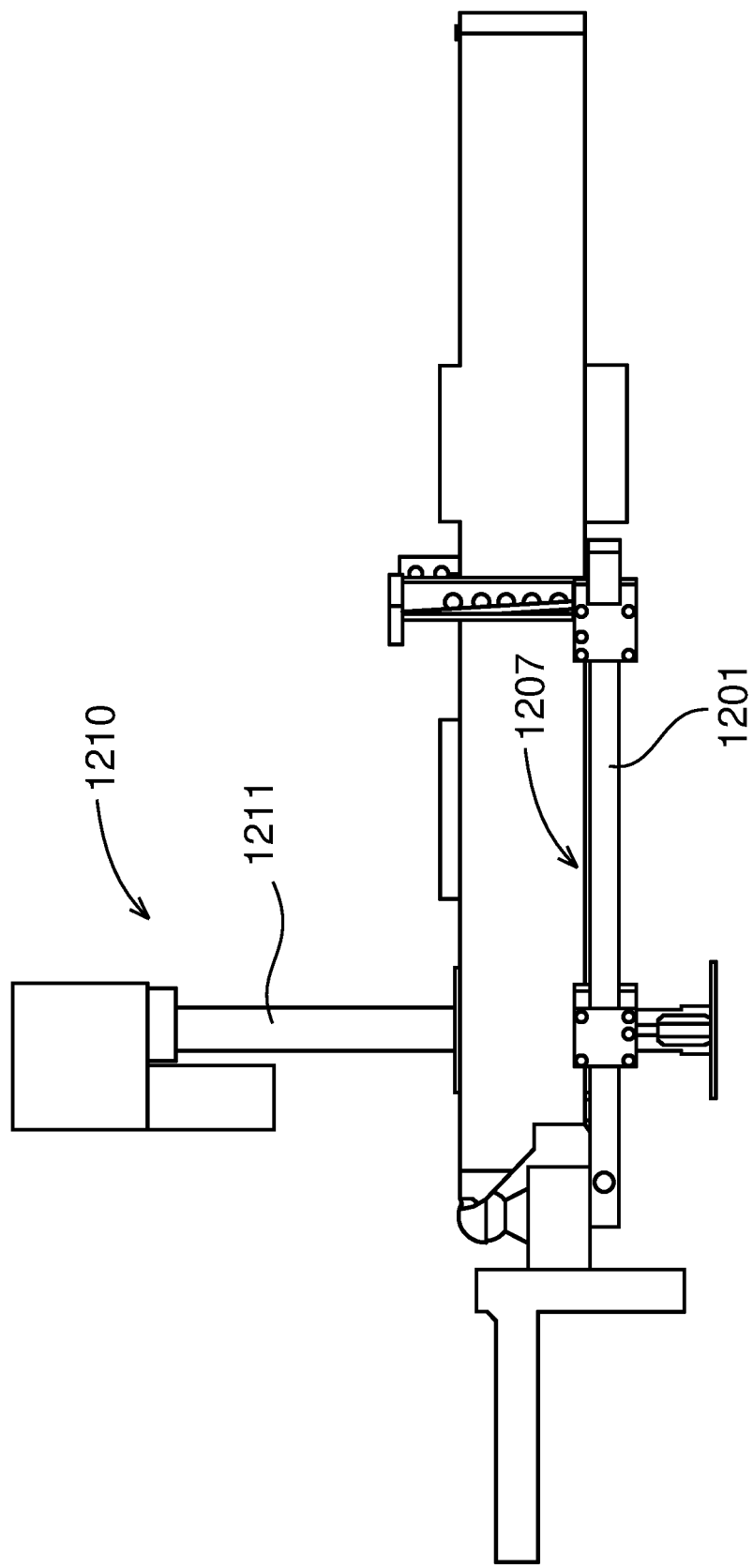
FIG. 18 is a side view of a twelfth exemplary embodiment of a weight distribution hitch system according to the present disclosure.

Now referring to FIG. 18, a twelfth exemplary embodiment of a weight distribution hitch system using the jack in compression to apply the moment force is shown. In various exemplary embodiments, the jack is raised and then connected to the system. In some embodiments, as the jack 1210 is lowered a cable 1207 or similar connector is pulled down with it. The cable is also attached to the moment bar 1201 in such a way (e.g., pulleys) such that it applies an upward moment force on the moment bar 1201.

Now referring to FIGS. 19 and 20, a thirteenth exemplary embodiment using the jack in compression rather than tension is shown. In this embodiment, a cable 1307 (e.g., a steel braided cable) is attached to the jack foot 1312 and routed to the moment bars 1301. In a preferred embodiment, the cable 1307 is routed between the frame and the moment bar 1301 as shown in FIG. 20.

Figure 21:
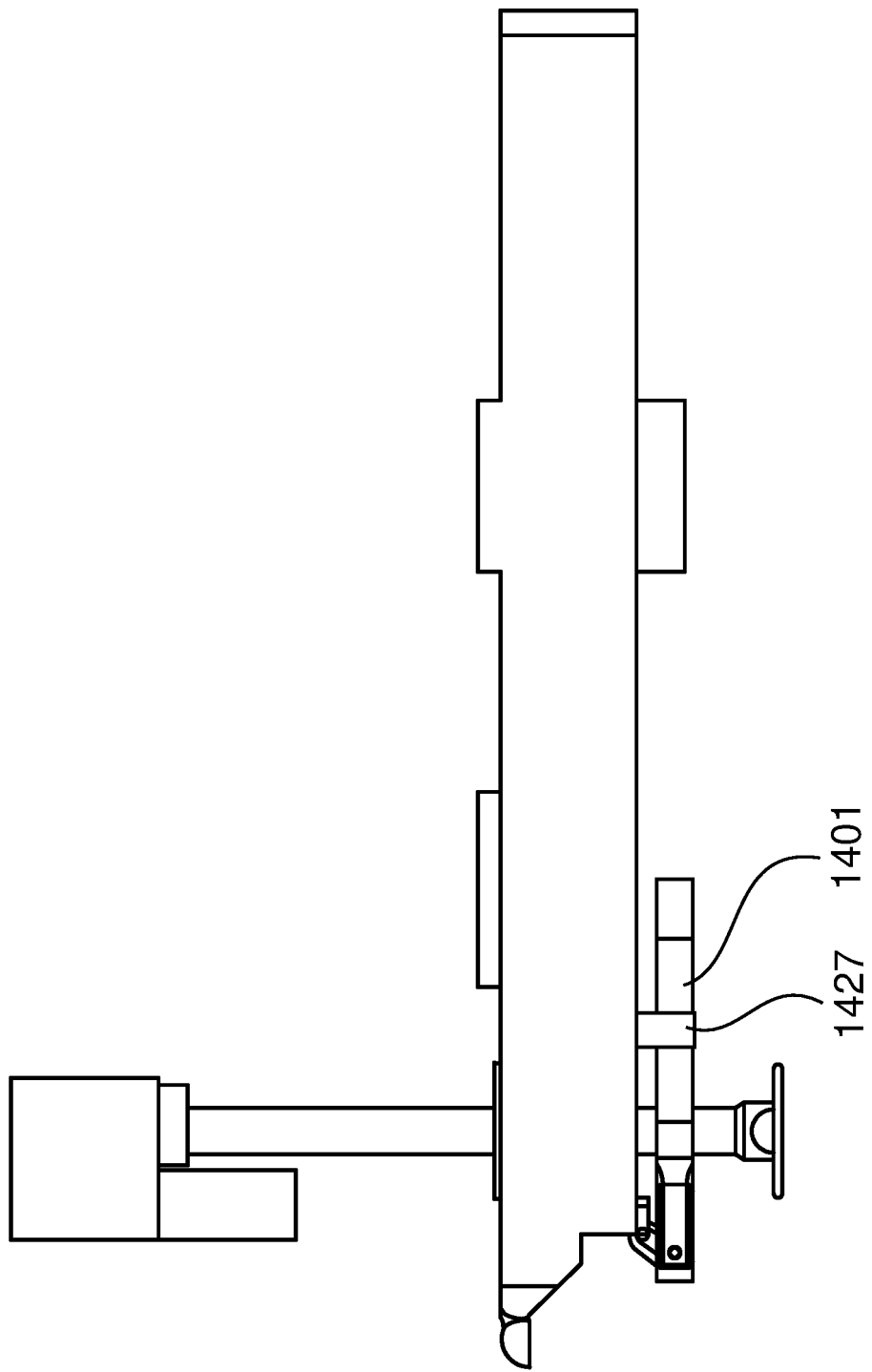
FIG. 21 is a side view of a fourteenth exemplary embodiment of a weight distribution hitch system according to the present disclosure.
Figure 22:
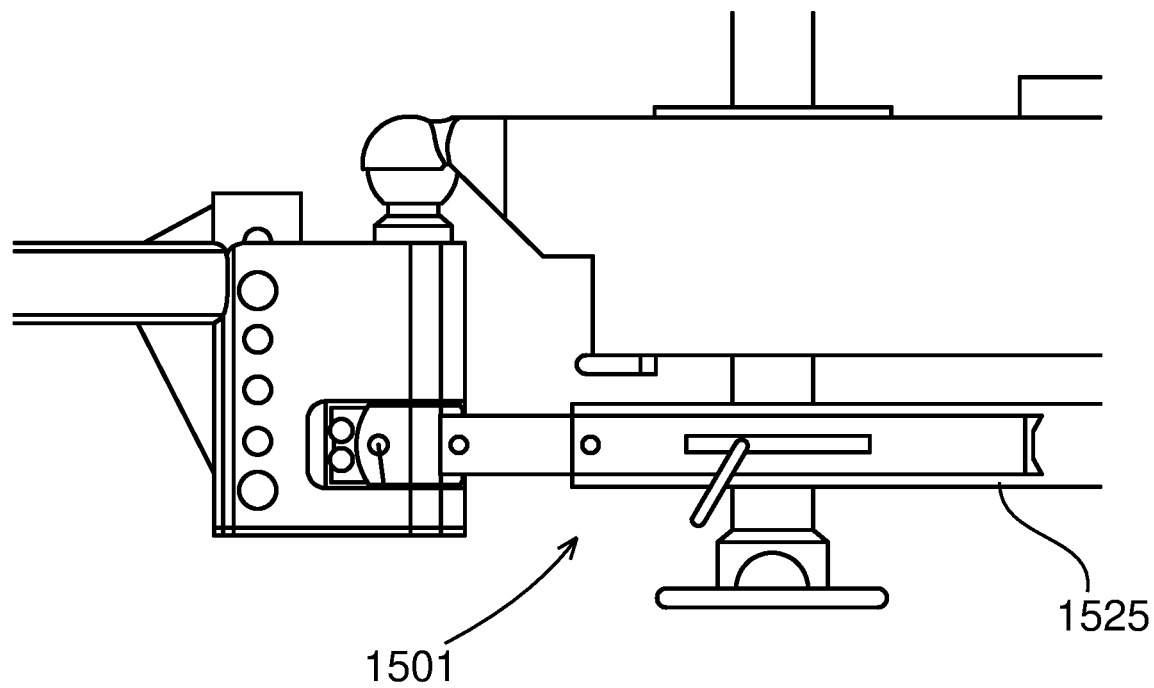
FIG. 22 is a side view of a fifteenth exemplary embodiment of a weight distribution hitch system according to the present disclosure.

Now referring to FIGS. 21 and 22, two exemplary embodiments of trailers with weight distribution hitch systems with moment bar storage under the trailer are shown. This prevents the moment bars from extending outward and becoming an obstacle or hazard to persons walking around the trailer. In FIG. 21, the moment bars 1401 are stowed or docked under the trailer using brackets 1427. In FIG. 22, the moment bars 1501 telescope in and out of brackets or sockets 1528 and are preferably locked in place using pins or similar devices.

All patents, published patent applications, and other publications referred to herein are incorporated herein by reference. The invention has been described with reference to various specific and preferred embodiments and techniques. Nevertheless, it is understood that many variations and modifications may be made while remaining within the spirit and scope of the invention.

What is claimed is:

1. A weight distribution system used with a hitch on a vehicle and a trailer, the weight distribution system comprising:
a moment bar with a forward end attached to the hitch so as to pivot about a generally vertical axis, the moment bar extending rearwardly along a center longitudinal plane of the trailer toward a rearward portion, the moment bar configured to exert a forward moment on the vehicle in response to an upward force on the rearward portion;
a bracket attached to a trailer frame element, wherein the bracket is above the rearward portion and further from the center longitudinal plane of the trailer than the rearward portion; and
a tension member having a first end and a second end, the tension member combined with a tension mechanism so as to increase and decrease a tensile force between the bracket and the rearward portion, to thereby increase and decrease the upward force on the rearward portion whereby sway of the trailer is reduced by biasing the system back to the centerline when the vehicle and trailer are out of alignment;
wherein the moment bar is disposed on a center longitudinal plane of the trailer.

2. The system of claim 1, wherein the tension member is flexible.

3. The system of claim 1, wherein the tension member is a cable.

4. The system of claim 1, wherein the tension member is a chain.

5. The system of claim 1, wherein the tension mechanism comprises a threaded screw.

6. The system of claim 1, wherein the tension mechanism is a jack.

7. The system of claim 1, wherein the trailer frame comprises an A-frame, the rearward end of the moment bar is disposed between two sides of the A-frame.

8. The system of claim 1 further comprising a first and second guide for the tension member disposed on the rearward portion of the moment bar, wherein the tension member communicates the force on the moment bar through the first guide and second guide.

9. The system of claim 1, further comprising a second bracket fixed to the frame of the trailer, wherein the first end of the tension member is attached to the first bracket and the second end of the tension member is attached to the second bracket and a middle portion of the tension member passes through a guide on the tension mechanism.

10. A weight distribution hitch system, comprising:
a lifting mechanism;
a moment bar having a forward portion pivotally connected about a vertical axis to a hitch coupling; and
a linkage bar with a rear portion connected to the trailer and a front portion adapted to interact with the lifting mechanism;
wherein a rear portion of the moment bar is pivotally connected about a lateral axis to the linkage bar such that when the lifting mechanism lifts on the front portion of the linkage bar, the rear portion of the moment bar is raised and induces a forward moment on the hitch coupling; and
wherein the moment bar is disposed on a center longitudinal plane of the trailer.

11. The system of claim 10, wherein the connection between the linkage bar and the moment bar are rearward of the lifting mechanism.

12. The system of claim 10, wherein the flexible tension member is a cable.

13. The system of claim 10, wherein the flexible tension member is a chain.

14. The system of claim 10, wherein the lifting mechanism is a jack.

15. The system of claim 10, wherein the lifting mechanism is a trailer jack.

* * * * *